United States Patent
Elshafie et al.

(10) Patent No.: US 12,192,146 B2
(45) Date of Patent: Jan. 7, 2025

(54) CONSIDERATIONS ON UPLINK REPETITIONS

(71) Applicant: QUALCOMM Incorporated, San Diego, CA (US)

(72) Inventors: Ahmed Elshafie, San Diego, CA (US); Yi Huang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 17/650,236

(22) Filed: Feb. 7, 2022

(65) Prior Publication Data

US 2023/0254091 A1    Aug. 10, 2023

(51) Int. Cl.
*H04L 5/00*   (2006.01)
*H04L 1/18*   (2023.01)
*H04W 72/21*  (2023.01)

(52) U.S. Cl.
CPC .............. *H04L 5/0055* (2013.01); *H04L 1/18* (2013.01); *H04W 72/21* (2023.01)

(58) Field of Classification Search
CPC ... H04L 5/0055; H04L 5/0053; H04L 5/0044; H04L 5/1469; H04L 1/08; H04L 1/18; H04W 72/21; H04W 72/23
See application file for complete search history.

(56) References Cited

U.S. PATENT DOCUMENTS

2020/0287688 A1*  9/2020  Takeda ................... H04L 5/0053
2023/0053388 A1*  2/2023  Yamamoto .............. H04L 27/26

FOREIGN PATENT DOCUMENTS

WO        2021161861 A1    8/2021

OTHER PUBLICATIONS

International Search Report and Written Opinion—PCT/US2023/060419—ISA/EPO—May 8, 2023.
Sharp: "Remaining Issues of UCI Enhancements for eURLLC", 3GPP TSG RAN WG1 #99, R1-1912769, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019, XP051823587, 2 Pages, p. 1, paragraph 2, p. 1, paragraph 4, p. 2, paragraph 5.

* cited by examiner

*Primary Examiner* — Peter Chen
(74) *Attorney, Agent, or Firm* — QUALCOMM Incorporated

(57) ABSTRACT

Certain aspects of the present disclosure provide techniques for skipping or using actual repetitions. A method that may be performed by a user equipment (UE) includes receiving, from a base station, a configuration indicating resources for a first repetition and a second repetition in a physical uplink control channel (PUCCH). In certain aspects, the method may also include transmitting the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

26 Claims, 13 Drawing Sheets

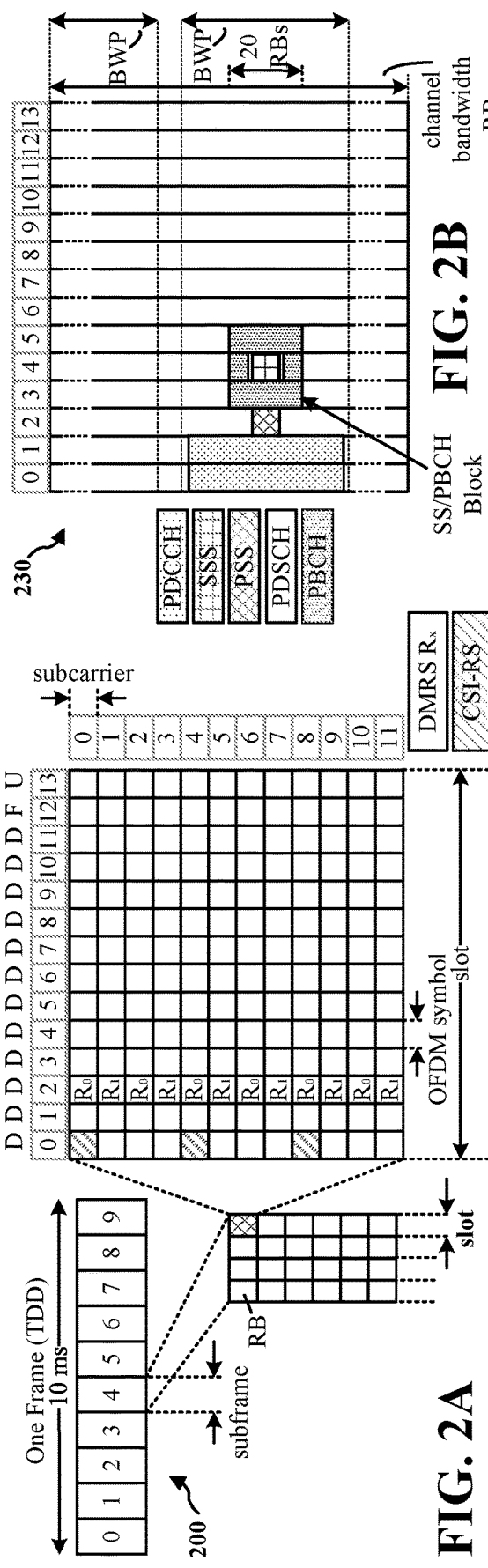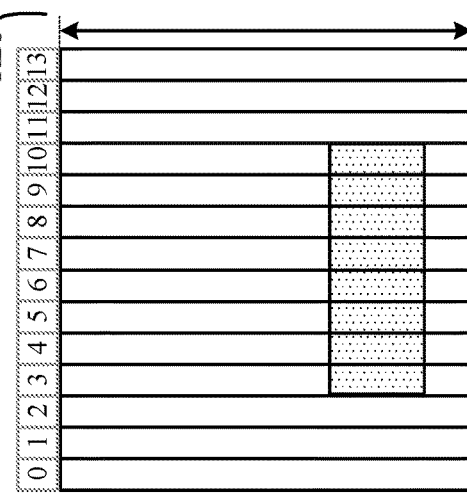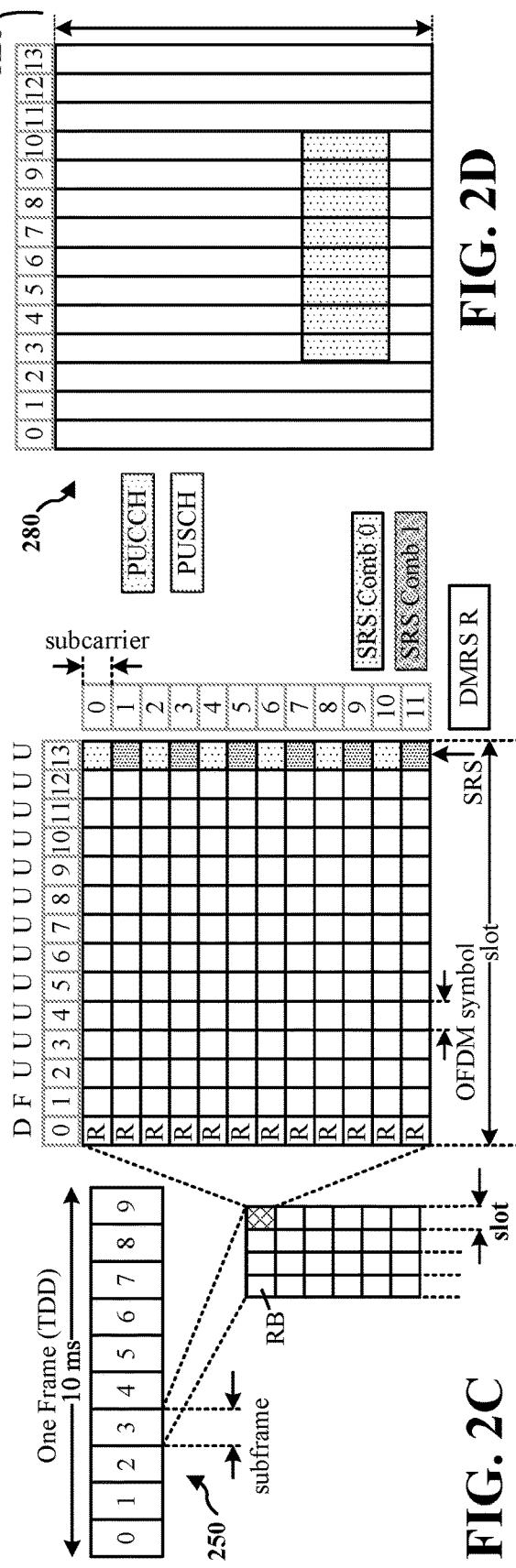
FIG. 2A  FIG. 2B  FIG. 2C  FIG. 2D

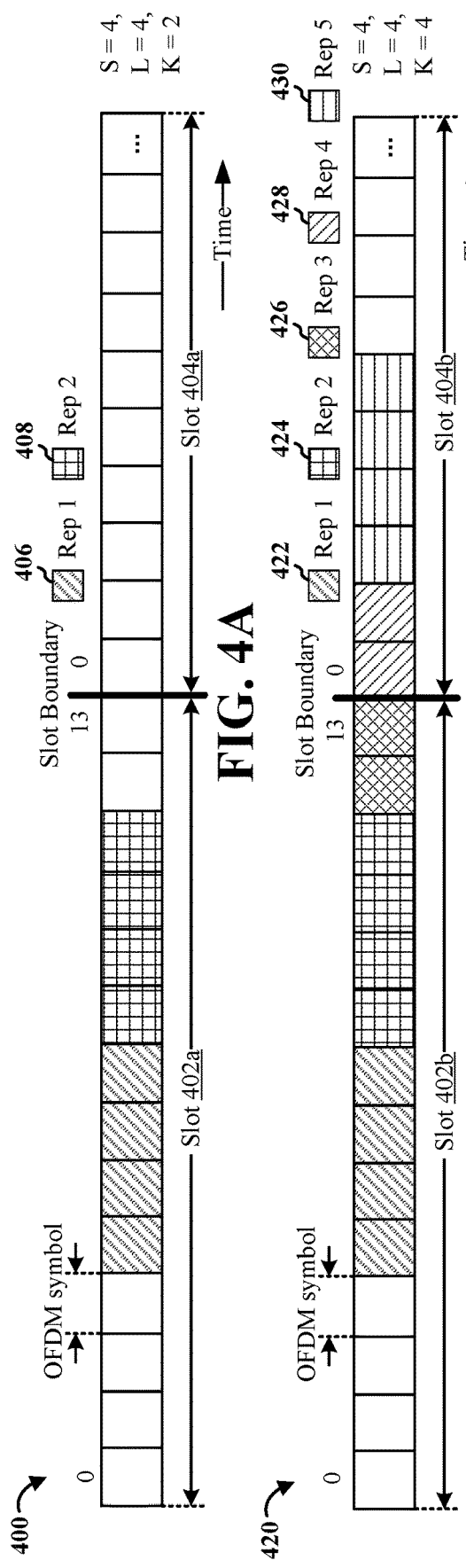
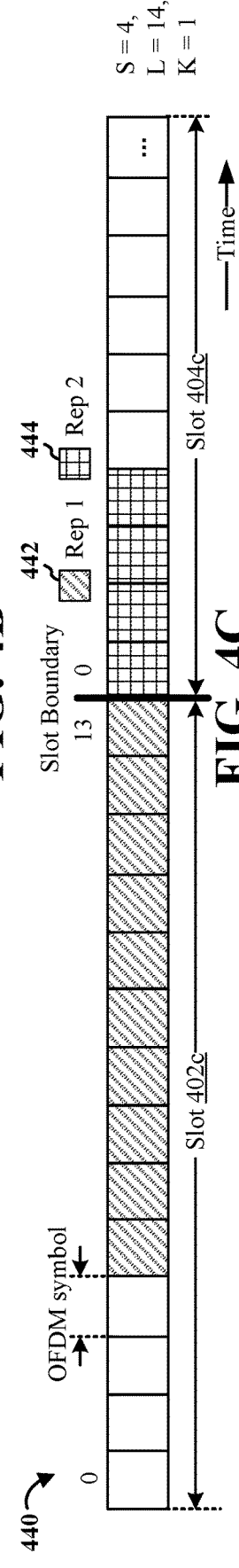
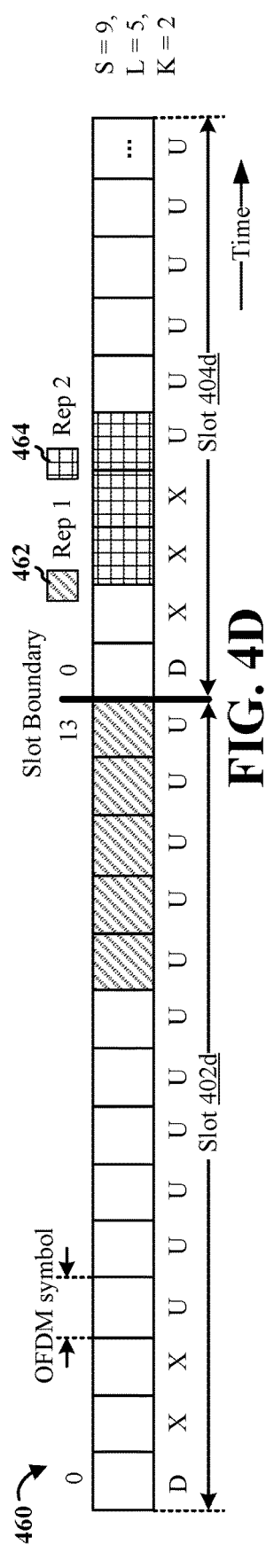
FIG. 4A  FIG. 4B  FIG. 4C  FIG. 4D

CONSIDERATIONS ON UPLINK REPETITIONS

BACKGROUND

Technical Field

The present disclosure generally relates to communication systems, and more particularly, to uplink transmission repetitions in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method of wireless communication at a user equipment (UE). In some examples, the method includes receiving, from a base station, a configuration indicating resources for a first repetition and a second repetition in a physical uplink control channel (PUCCH). In some examples, the method includes transmitting the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Certain aspects are directed to a method of wireless communication at a base station. In some examples, the method includes transmitting, to a user equipment (UE), a configuration indicating resources for a first repetition and a second repetition in a physical uplink control channel (PUCCH). In some examples, the method includes receiving the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Certain aspects are directed to a user equipment (UE) configured for wireless communications. In some examples, the UE includes a memory and a processor coupled to the memory. In some examples, the processor and memory are configured to receive, from a base station, a configuration indicating resources for a first repetition and a second repetition in a physical uplink control channel (PUCCH). In some examples, the processor and memory are configured to transmit the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Certain aspects are directed to a base station configured for wireless communication. In some examples, the base station includes a memory and a processor coupled to the memory. In some examples, the processor and memory are configured to transmit, to a user equipment (UE), a configuration indicating resources for a first repetition and a second repetition in a physical uplink control channel (PUCCH). In some examples, the processor and memory are configured to receive the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Certain aspects are directed to a user equipment (UE) for wireless communication. In some examples, the UE includes means for receiving, from a base station, a configuration indicating resources for a first repetition and a second repetition in a physical uplink control channel (PUCCH). In some examples, the UE includes means for transmitting the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Certain aspects are directed to a base station for wireless communication. In some examples, the base station includes means transmitting, to a user equipment (UE), a configuration indicating resources for a first repetition and a second repetition in a physical uplink control channel (PUCCH). In some examples, the base station includes means for receiving the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Certain aspects are directed to a non-transitory computer-readable medium having instructions stored thereon that, when executed by a user equipment (UE), cause the UE to perform operations. In some examples, the operations include receiving, from a base station, a configuration indicating resources for a first repetition and a second repetition in a physical uplink control channel (PUCCH). In some examples, the operations include transmitting the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Certain aspects are directed to a non-transitory computer-readable medium having instructions stored thereon that, when executed by a base station, cause the base station to perform operations. In some examples, the operations include transmitting, to a user equipment (UE), a configuration indicating resources for a first repetition and a second repetition in a physical uplink control channel (PUCCH). In some examples, the operations include receiving the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A-4D are diagrams illustrating an example of a set of symbols within a frame structure, over which repetitions of an uplink transmission are transmitted by a UE.

DETAILED DESCRIPTION

Figure 1:
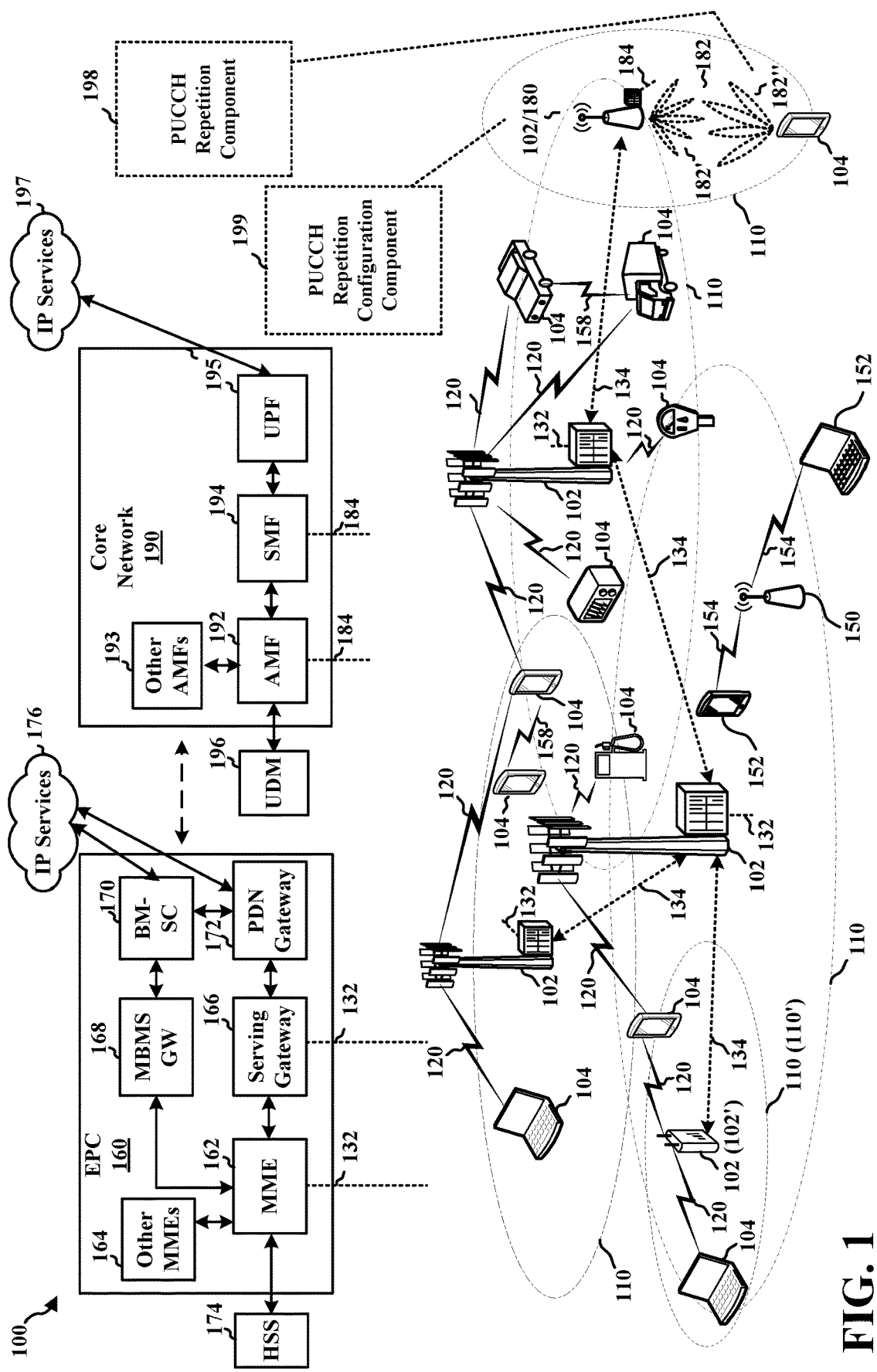
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A base station may configure a UE to transmit repetitions of uplink control transmissions of different symbol lengths to the base station. This repetition of control information may be performed in a similar manner as that of physical uplink shared channel (PUSCH) repetitions in PUSCH Repetition Type B. For instance, the UE may transmit multiple repetitions of a physical uplink control channel (PUCCH) signal over a contiguous number of symbols to the base station, where each repetition may either be a nominal repetition (e.g., having a configured symbol length), or an actual repetition (e.g., having a symbol length smaller than the configured symbol length). A repetition schedule for a PUCCH transmission including demodulation reference signals (DMRS) and uplink control information (UCI) may be defined by at least one of a starting symbol (S), a length of each uplink transmission (L), and a number of nominal repetitions (K).

The base station may also configure the UE to encode the uplink repetitions using a particular orthogonal cover code (OCC) so that the base station can properly receive and decode multiple orthogonal uplink transmissions from different UEs. For instance, multiple UEs may be respectively configured with different OCC vectors, and each UE may apply its respective OCC vector to its own PUCCH repetition at the same time as that of other UEs (e.g., simultaneously in the same symbols). Moreover, a given UE may apply different OCC vectors respectively to PUCCH repetitions of different symbol lengths (e.g., one OCC vector to symbols of a nominal repetition and another OCC vector to symbols of an actual repetition). Each of these OCC vectors of a given UE may be associated with an OCC index from a defined OCC matrix, and the length of a given OCC vector (as well as the dimensions of the associated OCC matrix) may correspond to the symbol length of the uplink transmission. For example, a first OCC vector applied to a nominal repetition having a symbol length of 4 may have a corresponding OCC vector length of 4 which is derived from a relatively larger 4×4 OCC matrix, and a second OCC vector applied to an actual repetition having a symbol length of 2 may have a corresponding OCC vector length of 2 which is derived from a relatively smaller 2×2 OCC matrix. Moreover, a given UE may apply different OCC vectors respectively for DMRS symbols and UCI symbols in a given PUCCH repetition, and each of these OCC vectors may be derived from a same or different OCC matrix (e.g., a DMRS matrix and an uplink data matrix).

However, problems may arise when the base station assigns a particular OCC index to a UE, and that OCC index corresponds to a relatively larger OCC matrix of multiple OCC matrices (such as an OCC index corresponding to the relatively larger 4×4 OCC matrix applied to the nominal repetition described above). For example, typically the base station may assign a common OCC index for multiple OCC matrices to a given UE (e.g., a same OCC index for both the relatively larger 4×4 OCC matrix and the relatively smaller 2×2 OCC matrix described above). However, because the assigned OCC index is generally derived from the relatively larger OCC matrix, the UE may not be able to find a vector having the common OCC index in the relatively smaller OCC matrix. For instance, a value of the assigned OCC index may be greater than the highest value index of the smaller OCC matrix. In other words, the smaller OCC matrix may not be large enough to include a vector corresponding to the assigned OCC index. Thus, the assigned OCC index may be an out-of-bounds value for one or more of the smaller matrices.

In some examples, the base station may resolve the issue of the out-of-bounds OCC index by determining a cardinality of OCC indices among the multiple OCC matrices based on a minimum dimension of the matrices, and then selecting the common OCC index for each PUCCH repetition (nominal and actual) based on this cardinality. For example, the base station may determine the cardinality of indices by determining a smallest OCC matrix size of one or more of DMRS matrices and uplink data matrices, then determine a range of indices available in the smallest OCC matrix. For example, the range of indices may be 2 if the smallest OCC matrix has a length of 2 (e.g., corresponding to the actual repetition described above). Because the range of indices belongs to the smallest OCC matrix, the same indices also exist in all of the other OCC matrices with which the UE is configured. As such, the base station may determine from the cardinality of indices an OCC index that is common among the DMRS matrices and/or the uplink data matrices, and the UE may derive its OCC vectors from that common OCC index for application to larger nominal repetitions as well as smaller actual repetitions.

However, minimizing the cardinality of OCC indices such as in this manner can result in significant limitations on the base station's ability to multiplex nominal repetitions of multiple UEs at the same time, since the number of UEs which would be capable of transmitting nominal repetitions at the same time depends on the minimum length of the OCC matrices. For instance, multiple UEs may intend to simultaneously transmit a nominal PUCCH repetition applying an OCC vector associated with an OCC index derived from a relatively larger OCC matrix, while later simultaneously transmitting an actual PUCCH repetition applying a different OCC vector associated with a same OCC index derived from a relatively smaller OCC matrix. In such case, the number of UEs which could simultaneously transmit the nominal PUCCH repetition would be limited to the number of UEs that would simultaneously transmit the actual PUCCH repetition. For example, even if N UEs (e.g., 4 UEs) intend to transmit nominal repetitions as a result of a relatively larger N×N OCC matrix (e.g., 4×4 matrix), if a smaller OCC matrix (e.g., 2×2 matrix) is applied to subsequent actual repetitions, only a subset of these UEs (e.g., 2 of the 4 UEs) would actually be able to transmit the nominal repetitions in overlapping resources (e.g., simultaneously) based on a minimum cardinality of OCC indices. Thus, if the base station determines the indices based on the matrices having the smallest length, then the number of UEs that can be scheduled to transmit at the same time may be limited to less than the maximum capable.

Accordingly, aspects of the disclosure allow for the multiplexing of N UEs in nominal repetitions, rather than a subset of N UEs as previously described, when PUCCH transmissions include nominal and actual repetitions associated with different OCC vectors. Aspects of the disclosure also allow for minimally reducing the number of UEs multiplexed in smaller actual repetitions, for example, by allowing UEs to determine whether or not to skip transmission over these smaller repetitions. These aspects allow the UEs (which otherwise would have had their uplink transmissions subject to interference) to save their power by not transmitting over certain symbols (e.g., an actual repetition), while also providing for a maximum possible number of UEs transmitting during a nominal repetition. Accordingly, the number of UEs transmitting uplink repetitions may no longer be limited by a number of symbols in a smallest actual repetition.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a PUCCH repetition component 198. The PUCCH repetition component 198 may be configured to receive, from a base station, a configuration indicating resources for a first repetition and a second repetition in a physical uplink control channel (PUCCH). The PUCCH repetition component 198 may be configured to transmit the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Referring again to FIG. 1, in certain aspects, the base station 102/180 may include a PUCCH repetition configuration component 199. The PUCCH repetition configuration component 199 may be configured to transmit, to a user equipment (UE), a configuration indicating resources for a first repetition and a second repetition in a physical uplink control channel (PUCCH). The PUCCH repetition configuration component 199 may be configured to receive the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
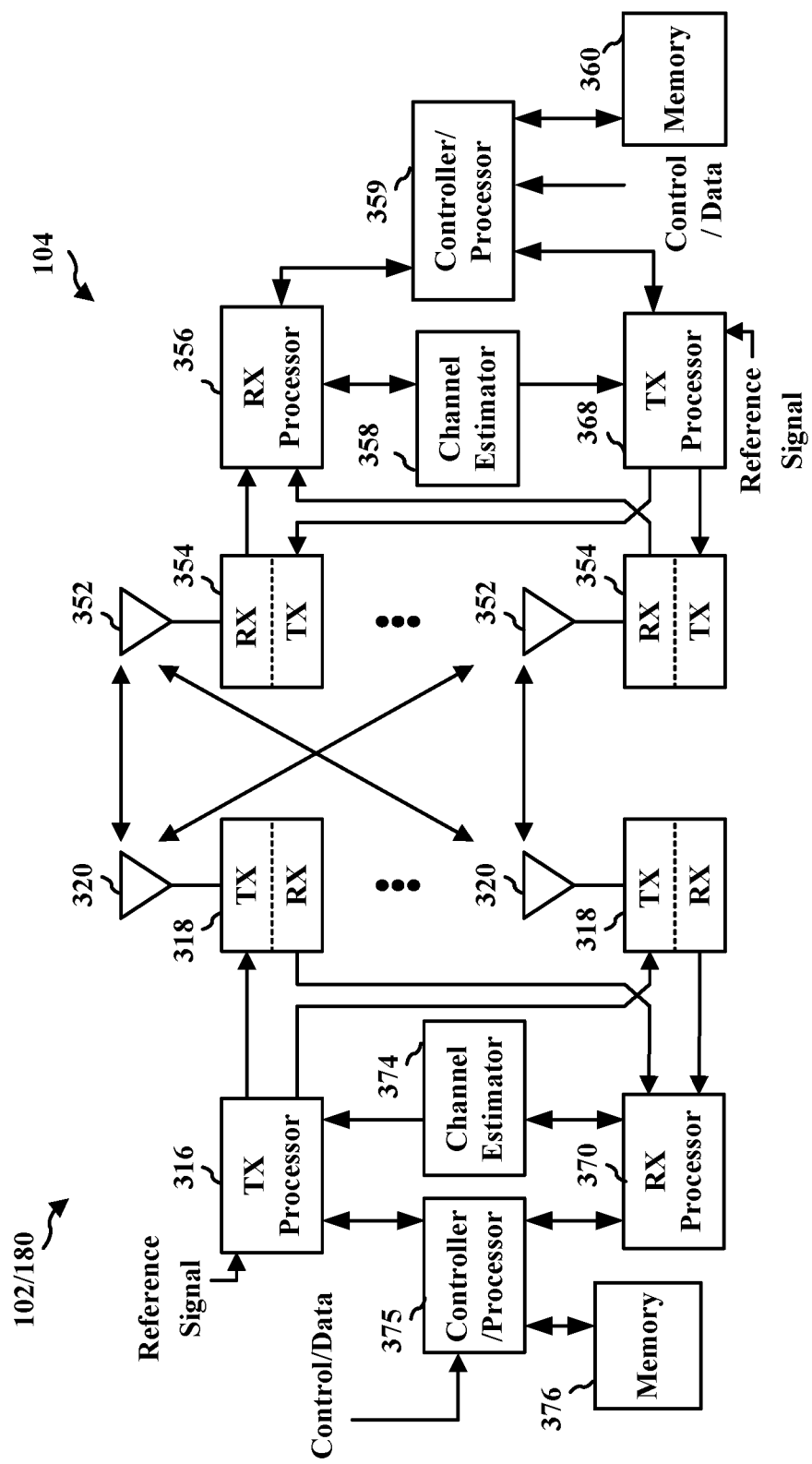
FIG. 3 is a diagram illustrating an example of a base station and user equipment (UE) in an access network.

FIG. 3 is a block diagram of a base station 102 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PUCCH repetition component 198 of FIG. 1. For example, the PUCCH repetition component 198 may be configured to receive, from a base station, a configuration indicating resources for a first repetition and a second repetition in a physical uplink control channel (PUCCH). The PUCCH repetition component 198 may also be configured to transmit the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a number of the first UEs is larger than a number of the second UEs.

At least one of the TX processor 316, the RX processor 370, and the controller/processor 375 may be configured to perform aspects in connection with the PUCCH repetition configuration component 199 of FIG. 1. The PUCCH repetition configuration component 199 may be configured to transmit, to a user equipment (UE), a configuration indicating resources for a first repetition and a second repetition in a physical uplink control channel (PUCCH). The PUCCH repetition configuration component 199 may also be configured to receive the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a number of the first UEs is larger than a number of the second UEs.

Examples of Uplink Transmission Repetitions

FIGS. 4A-4D are diagrams illustrating examples of a set of symbols within a frame structure, over which repetitions of an uplink transmission are transmitted by a UE (e.g., UE 104 of FIGS. 1 and 3). In each example, the frame structure is a 5G NR slot having time division duplexed (TDD) symbols that are dedicated for downlink (DL), uplink (UL), and/or special/flexible symbols (X). In the examples provided by FIGS. 4A-4D, the slot structure is illustrated with a series of contiguous blocks, each of which represents a single symbol. A vertical line represents a slot boundary indicating an ending of a first slot (e.g., a first slot 402a of FIG. 4A, a first slot 402b of FIG. 4B, a first slot 402c of FIG. 4C, a first slot 402d of FIG. 4D), and the beginning of a second slot (e.g., a second slot 404a of FIG. 4A, a second slot 404b of FIG. 4B, a second slot 404c of FIG. 4C, a second slot 404d of FIG. 4D). Here, the first slot 402a, 402b, 402c, 402d includes fourteen symbols numbered 0-13, and is assumed to be TDD. The second slot 404a, 404b, 404c, 404d is partially illustrated showing only ten symbols.

FIG. 4A illustrates a first frame structure 400, where a base station may schedule a UE (e.g., via downlink control information (DCI) or other configuration) to transmit repetitions of an uplink signal (e.g., physical uplink control channel (PUCCH) or physical uplink shared channel (PUSCH)). The repetition schedule may be defined by at least one of a starting symbol (S), a length of each uplink transmission (L), and a number of nominal repetitions (K). Here K is indicative of the number of times the uplink signal is configured to be repeated. In this example, S=4, L=4, and K=2. Thus, the UE is scheduled to repeat an uplink signal having a length of four symbols and starting at symbol 4, and transmit the repeated uplink signal twice (e.g., first repetition 406 and second repetition 408). Thus, the UE transmits the first repetition 406 over symbols 4-7 and the second repetition 408 over symbols 8-11, of the first slot 402a. Because both of the repeated uplink signals were transmitted within the first slot 402a, the UE does not transmit any additional repetitions within the second slot 404a.

FIG. 4B illustrates a second frame structure 420, where the UE may be scheduled to transmit repetitions of an uplink signal, where the schedule is defined by S=4, L=4, and K=4. Thus, the UE is scheduled to repeat an uplink signal having a length of four symbols starting at symbol 4 and transmitted four times. However, unlike the example illustrated in FIG. 4A, the UE will be required to transmit the repetitions of the uplink signal in both the first slot 402b and the second slot 404b because of the higher number of nominal repetitions. Moreover, because a slot boundary falls within one of the transmissions, the boundary splits what would otherwise be the third nominal repetition (beginning with Rep 3) into two or more actual repetitions. In this example, a third actual repetition 426 and a fourth actual repetition 428 are two actual transmissions that replace the third nominal transmission. In other words, the UE transmits a first nominal repetition 422 over symbols 4-7 of the first slot 402b, a second nominal repetition 424 over symbols 8-11 of the first slot 402b, a third actual repetition 426 over symbols 12 and 13 of the first slot 402b, a fourth actual repetition 428 over symbols 0 and 1 of the second slot 404b, and a fifth nominal repetition 430 over symbols 2-5 of the second slot 404b. Thus, in this example, the UE transmits five actual repetitions due to the slot boundary falling within a configured nominal repetition.

FIG. 4C illustrates a third frame structure 440, where the UE may be scheduled to transmit an uplink signal, where the schedule is defined by S=4, L=14, and K=1. Thus, the UE is scheduled to transmit an uplink signal once, where the signal has a length of 14 symbols and starting at symbol 4 of the first slot 402c. Here, because the frame structure uses a 14-symbol slot length, and because the uplink symbol starts at symbol 4, the uplink signal will be split by a slot boundary. Thus, in lieu of only one configured nominal transmission of the uplink signal (e.g., K=1), the UE transmits two actual repetitions of the uplink signal (e.g., a first repetition 442 transmitted over symbols 4-13 of the first slot 402c, and a second repetition 444 transmitted over symbols 0-3 of the second slot 404c).

In certain aspects, other events may also replace a configured nominal repetition with a smaller actual repetitions. For example, if a downlink symbol (or a flexible symbol not configured for uplink) falls within configured symbols for a nominal repetition, then the UE may refrain from transmitting over the downlink or flexible symbols and the remaining configured symbols would carry a smaller actual repetition starting from the next uplink symbol. In one scenario, the base station may transmit a slot-format indicator (SFI) or a higher layer parameter (e.g., InvalidSymbolPattern) configured to provide the UE with a symbol level bitmap defining an uplink and downlink allocation spanning one or more slots. These parameters may indicate invalid symbols for nominal repetitions, resulting in actual repetitions being transmitted in the remaining symbols. Thus, in some cases, the UE may receive messaging indicating a change to the uplink and downlink allocation of a slot that may potentially replace a nominal repetition with an actual repetition.

As an example, FIG. 4D illustrates a fourth frame structure 460, where the UE may be scheduled to transmit a repetition of an uplink signal, where the schedule is defined by S=9, L=5, and K=2. Thus, the UE is scheduled to transmit an uplink signal twice, where the signal has a length of 5 symbols and a starting symbol 9 of the first slot 402d. Here, because the starting symbol prevents both repetitions from being transmitted within the first slot 402d, the UE may transmit the first repetition 462 within the first slot 402d and the second repetition 464 within the second slot 404d. In this example, each symbol of the frame structure is labeled with a D, an X, or a U, indicating that a corresponding symbol is a downlink (D) symbol, a special/flexible symbol (X), or an uplink (U) symbol. Here, as illustrated, the first two symbols of the second slot 404d are a downlink symbol and a special/flexible symbol not configured for uplink transmission, which are invalid symbols for nominal repetitions. For example, the UE may determine these two symbols may not carry an uplink signal from the SFI or higher layer parameter InvalidSymbolPattern. Accordingly, the UE may begin transmission of the second repetition 464 (as an actual repetition) using the first available uplink symbol (e.g., symbol 2) in the second slot 404d. In this example, the second repetition 464 would only span the remaining three symbols of the second configured five symbols for repetitions.

Figure 5:
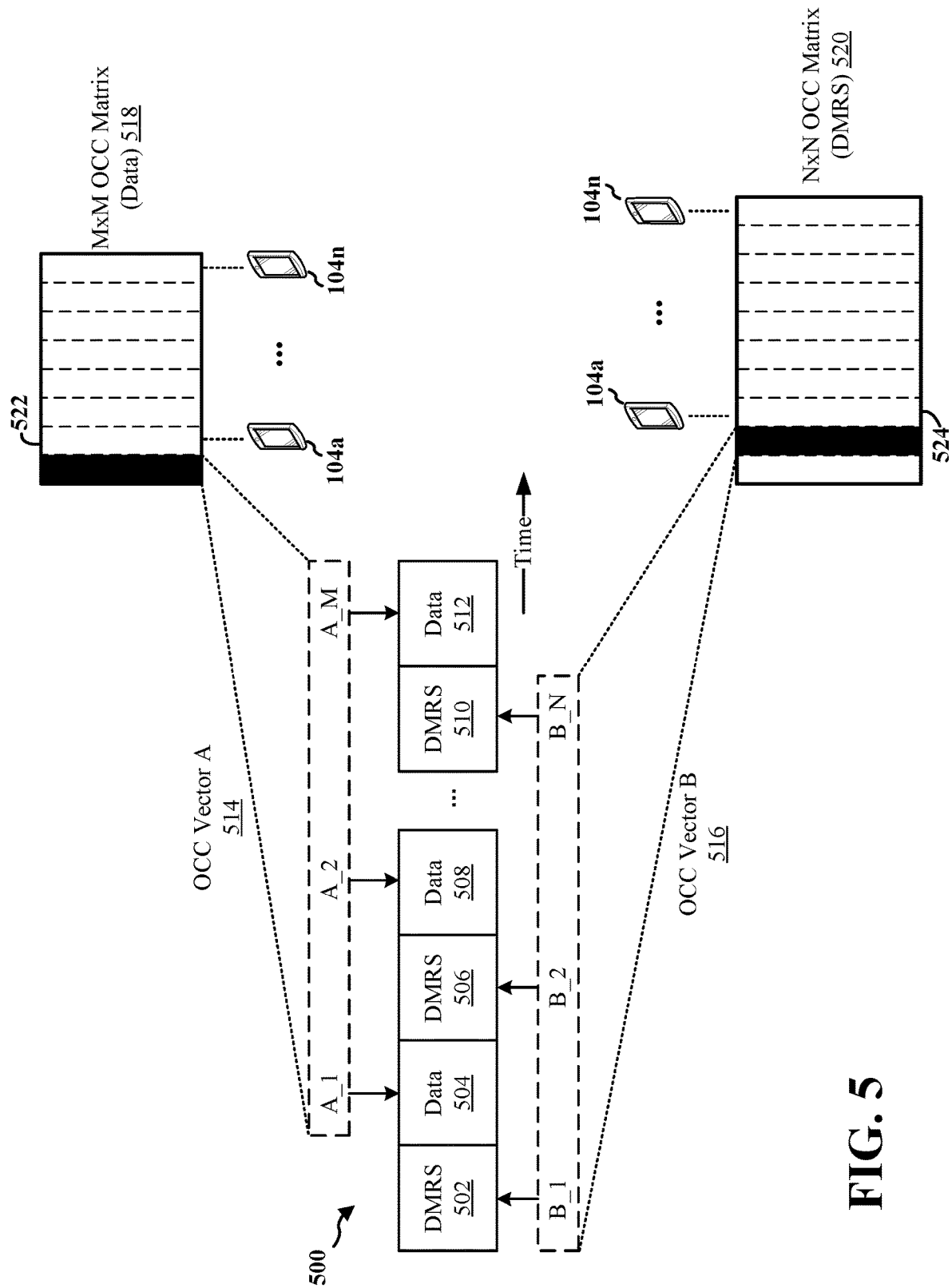
FIG. 5 is a diagram illustrating an example uplink transmission by a first UE.

FIG. 5 is a diagram illustrating an example uplink transmission 500 by a first UE (e.g., UE 104 of FIGS. 1 and 3). In this example, the uplink transmission 500 may be a first transmission of a series of repeated uplink transmissions carrying uplink payload data (e.g., a uplink control information (UCI)). In this example, the uplink transmission 500 may be a PUCCH format 1 configured for transmission of a 1- or 2-bit payload data with 4-14 orthogonal frequency-division multiplexing (OFDM) symbols, although the uplink transmission may not be limited to this PUCCH format.

The uplink transmission 500 carries alternating demodulation reference signals (DMRS) and uplink payload data, where each of the DMRS and data have been encoded using a vector of an orthogonal cover code (OCC) matrix. In this example, the DMRS is encoded using a first matrix 518, and the data is encoded using a second matrix 520, although the same matrix may be used to encode both DMRS and data in other examples. The first UE may be configured with the first matrix 518 and the second matrix 520 by a base station (e.g., base station 102/180 of FIG. 1, base station 102 of FIG. 3) via radio resource control (RRC) signaling and/or any other suitable means. The first matrix 518 may be an M×M OCC matrix (where M is a non-zero integer), and the second matrix 520 may be an N×N OCC matrix (where N is a non-zero integer which may be the same as or different than M). Here, each column of the first and second matrices may comprise a vector for applying an OCC to the uplink transmission 500. As illustrated, vector A 514 is applied to the data portions of the uplink transmission 500, and vector B 516 is applied to the DMRS portions of the uplink transmission 500. Here, vector A 514 includes a plurality of OCC elements: $A_1$-$A_M$, and vector B 516 includes OCC elements $B_1$-$B_N$.

In some examples, the first UE may use a cell-specific sequence to transmit the modulated DMRS and modulated data in other symbols. The DMRS and the data may be modulated using any suitable technique for modulation of uplink signaling (e.g., binary phase-shift keying (BPSK), quadrature phase shift keying (QPSK), etc.). For instance, for BPSK modulation, payload data may be modulated using values of either 1 or −1.

Moreover, each modulated sequence of the uplink transmission 500 may be further applied with an element of a respective OCC vector (e.g., vector A 514 for data and vector B 516 for DMRS). For example, DMRS 502 of a first symbol of uplink transmission 500 has been orthogonally cover coded with the $B_1$ value, DMRS 506 of a third symbol of uplink transmission 500 has been orthogonally cover coded with the $B_2$ value, and at the end of the uplink transmission 500, DMRS 510 of a last symbol of uplink transmission 500 has been orthogonally cover coded with the $B_N$ value. Similarly, data 504 of a second symbol of uplink transmission 500 has been orthogonally cover coded with the $A_1$ value, data 508 of a fourth symbol of uplink transmission 500 has been orthogonally cover coded with the $A_2$ value, and data 512 at the last symbol of uplink transmission 500 has been orthogonally cover coded with the $A_M$ value.

The first UE may be one of a plurality of UEs that use the same matrices for transmission of uplink DMRS and data. For example, in a multi-UE scenario, a base station may configure each of the UEs with the same matrices (e.g., the first matrix 518 and/or the second matrix 520), as well as which vectors each UE may use for uplink transmissions. In the example illustrated, the base station may configure the first UE with vector A 514 of the first matrix 518, and vector B 516 of the second matrix 520 (where both vectors are respectively represented by the black columns of the OCC matrices in FIG. 5). The base station may configure any suitable number of UEs (e.g., UEs 104a-104n) with the same matrices, but with different vectors relative to the other UEs. Thus, for example, the base station may configure a second UE 104b with vector B 522 of the first matrix 518, and vector C 524 of the second matrix 520. This way, even if the first UE and the second UE transmit uplink signaling over the same time and frequency resources, the base station will be able to decode the uplink signals of each UE because the uplink signals are orthogonal to each other as a result of the different OCC vector applied to each signal.

Figure 6:
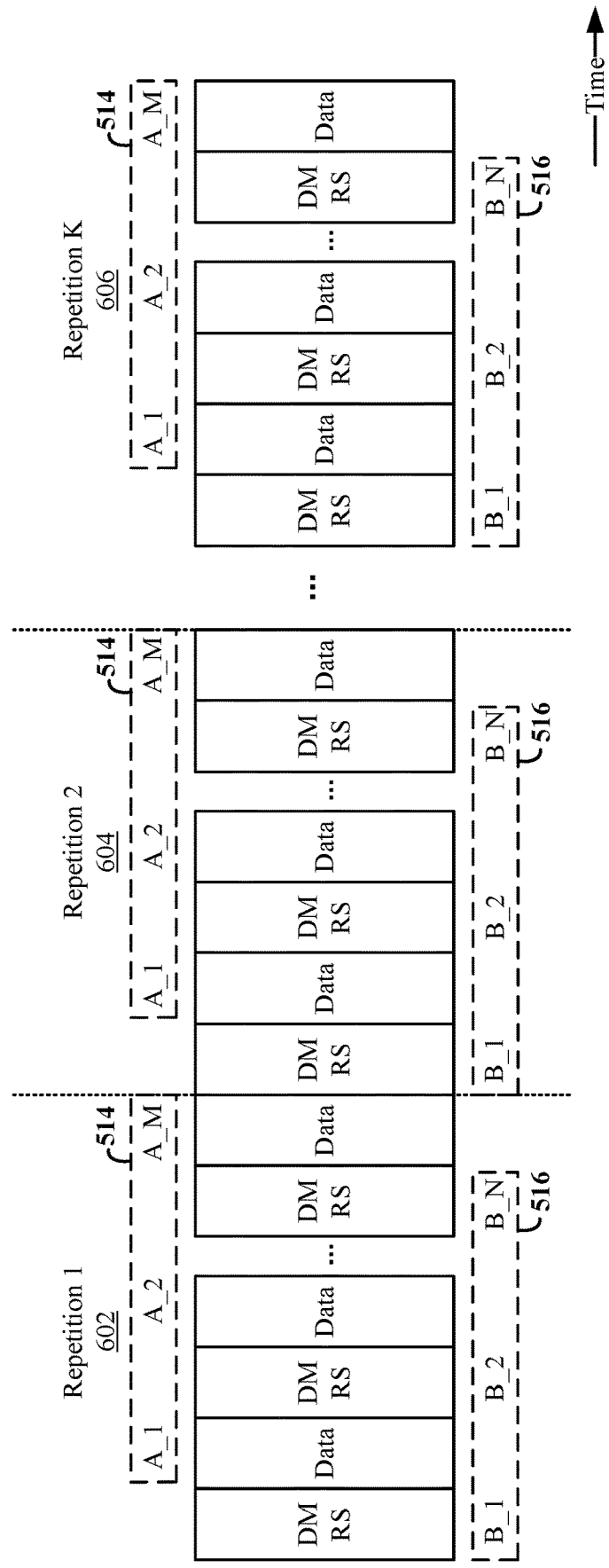
FIG. 6 is a diagram illustrating an example of nominal repeat uplink transmissions.

FIG. 6 is a diagram illustrating an example of nominal repeat uplink transmissions 600 (e.g., repeated instances of the uplink transmission 500 of FIG. 5 each having a same symbol length). Here the first UE transmits the uplink transmission 500, K number of times. In this example, each of the K repetitions are nominal repetitions that are not broken up by a slot boundary, SFI, etc. That is, the ending symbol of a first repetition 602 is contiguous to a beginning symbol of a second repetition 604, and so on until the last repetition (the Kth repetition 606).

As illustrated, each repetition of the uplink transmission is also identical to the other repetitions in terms of content and structure. That is, while the first repetition 602, the second repetition 604, and the Kth repetition 606 all occur at different times, each of the repetitions have an OCC applied using the same vectors (e.g., vector A 514 and vector B 516) of the same matrices (e.g., first matrix 518 and second matrix 520). Each of the repetitions also carry the same data as the other repetitions (e.g., N DMRS symbols, and M data symbols) in the same symbol order. However, in some scenarios, at least one repetition of a signal may be broken up by a slot boundary or other event.

As discussed, a base station may provide a UE with an indication of a particular vector (e.g., an OCC index) of an OCC matrix, and the UE may apply an OCC to an uplink transmission using the vector. In uplink repetition transmissions, the UE may apply the same OCC to each of the repeated uplink transmissions. This method of encoding repeated uplink transmissions works well with nominal repeat transmissions that are not broken up by a slot boundary or other event. However, as discussed in FIGS. 4A-4D, in some scenarios, a single nominal repeat transmission may be replaced with two or more actual transmissions. In such a case, the particular vector may not work for each of the actual transmissions, because the particular vector is configured for the single nominal transmission, and each of the actual transmissions, by themselves, may have fewer symbols than the nominal transmission. Thus, the UE may use differently sized vector(s) to accommodate each of the smaller sized actual transmissions.

Accordingly, a base station may configure the UE with multiple OCC matrices of varying sizes so that the UE may use appropriately sized vectors from the multiple OCC matrices to encode each of the smaller sized actual repetitions.

Figure 7:
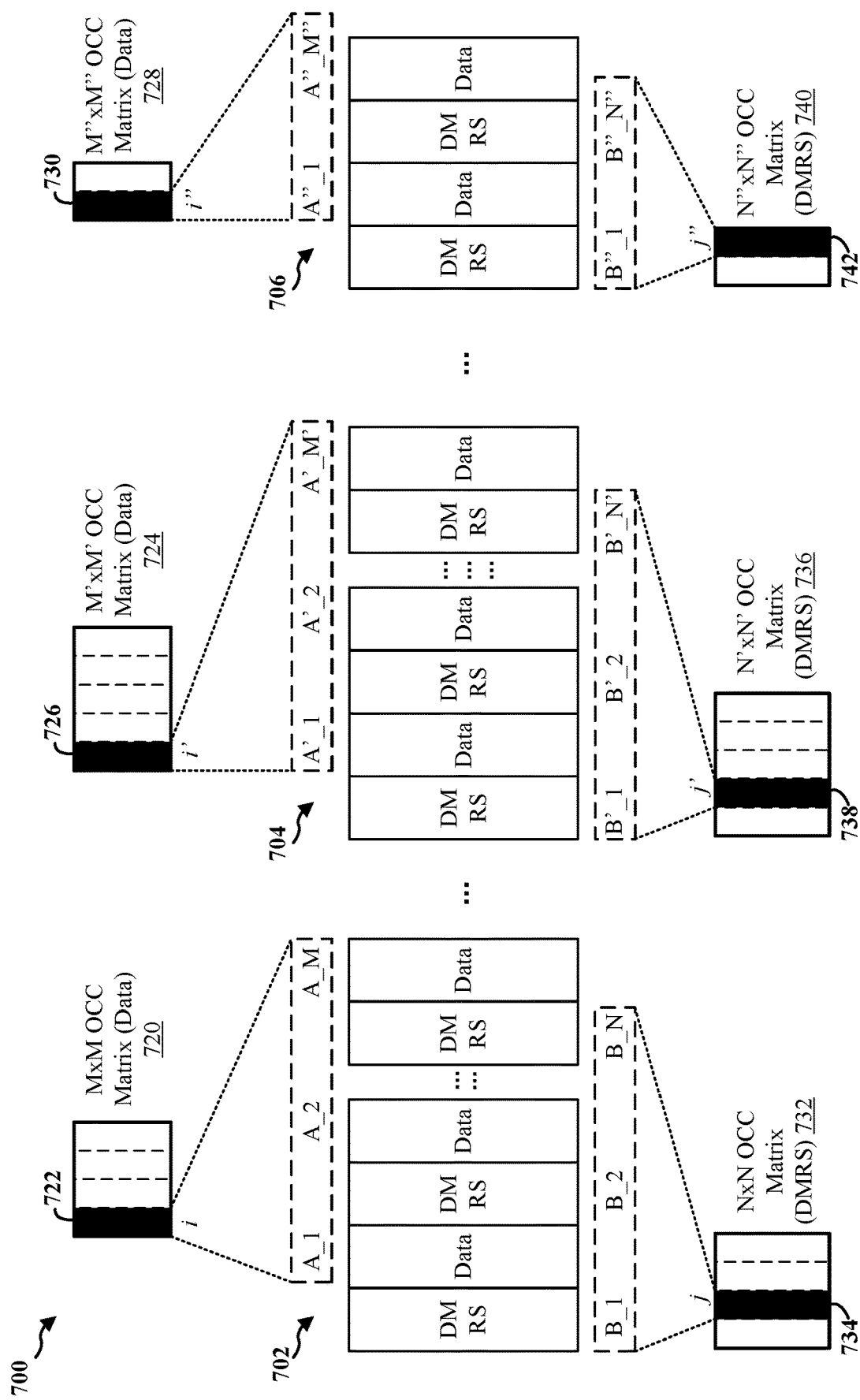
FIG. 7 is a diagram illustrating an example of actual repeated uplink transmissions.

FIG. 7 is a diagram illustrating an example of actual repeated uplink transmissions 700 (e.g., repetitions of an uplink transmission that have fewer symbols than that of a configured nominal repetition). In one example where the uplink transmission 500 of FIG. 5 has a length of 10 symbols (e.g., L=10), then a nominal repetition of the uplink transmission 500 would be 10 contiguous symbols unbroken by a slot boundary or other event. However, as illustrated in FIGS. 4B-4D, a nominal repetition of a signal can be replaced with multiple actual repetitions resulting in different symbol lengths for each of the PUCCH repetitions. Accordingly, PUCCH repetitions may require different matrix lengths (e.g., M, M', M", N, N', N") in order to provide an appropriately sized OCC vector for different sized repetitions. For instance, one PUCCH repetition (e.g., a nominal repetition) may have M data symbols and N DMRS symbols, another PUCCH repetition (e.g., an actual repetition) may have M' data symbols and N' DMRS symbols, and another PUCCH repetition (e.g., another actual repetition) may have M" data symbols and N" DMRS symbols, where M, M', M" are not all the same values, and N, N', and N" are not all the same values.

In the illustrated example, the UE may be configured with multiple matrices for OCC encoding of DMRS transmissions (e.g., including an N×N OCC matrix 732, an N'×N' OCC matrix 736, and an N"×N" OCC matrix 740), and multiple matrices for OCC encoding of uplink control information transmissions (e.g., including an M×M OCC matrix 720, an M'×M' OCC matrix 724, and an M"×M" OCC matrix 728). In the illustrated example, N'>N>N", and M'>M>M". For instance, in the example of FIG. 7, the middle repetition may be a nominal repetition, while the left and right repetitions may be actual repetitions.

The base station may also configure the UE with a particular one column or vector of each of the matrices to use for OCC encoding of UCI and/or DMRS. For example, the base station may indicate (e.g., via a vector index or OCC index i) a first vector 722 of the M×M OCC matrix 720 and indicate (e.g., via a vector index or OCC index j) a second vector 734 of the N×N OCC matrix 732. Similarly, the base station may indicate (e.g., via respective vector indices i' and j') a first vector 726 of the M'×M' OCC matrix 724 and a second vector 738 of the N'×N' OCC matrix 736, as well as indicate (e.g., via respective vector indices i "and j") a first vector 730 of the M"×M" OCC vector matrix 728 and a second vector 742 of the N"×N" OCC vector matrix 740. It should be noted, however, that in some examples, that the indices associated with the UCI matrices may be the same vector index value (e.g., i=i"), and/or the indices associated with the DMRS matrices may be the same vector index value (e.g., j=j'=j"). Moreover, in some examples, a vector index value for a one or more of the UCI matrices may be the same vector index value for one or more of the DMRS matrices (e.g., i=j, i'=j', i"=j"). The base station may assign other vectors not used by the UE to other UEs that share the same UCI and DMRS matrices.

In one example, the UE may transmit a first actual repetition transmission 702 (e.g., replacing a nominal repetition) having a length of eight symbols (e.g., L>8). In this example, the transmission may include L/2 DMRS symbols and L/2 UCI symbols (e.g., 4 DMRS and 4 UCI symbols), although the number of DMRS and UCI symbols may be different in other examples. Thus, in this example, the UE may use the N×N OCC matrix 732 (where N=4) and the M×M OCC matrix 720 (where M=4) to encode the DMRS and uplink control information symbols. In this example, the base station has configured the UE to use first vector 722 [A_1-A_M] of the M×M OCC matrix 720 to encode the UCI symbols, and second vector 734 [B_1-B_N] of the N×N OCC matrix 732 to encode the UCI symbols.

Moreover, the UE may transmit a second repetition transmission 704 (e.g., a nominal repetition) having a length of ten symbols (e.g., L>10), similarly in this example including L/2 DMRS symbols and L/2 UCI symbols (e.g., 5 DMRS and 5 UCI symbols). Thus, in this example, the UE may use the N'×N' OCC matrix 736 (where N'=5) and the M'×M' OCC matrix 724 (where M'=5) to encode the DMRS and uplink control information symbols. In this example, the base station has configured the UE to use first vector 726 [A'_1-A'_M'] of the M'×M' OCC matrix 724 to encode the UCI symbols, and second vector 738 [B'_1-B'_N'] of the N'×N' OCC matrix 736 to encode the DMRS symbols.

Furthermore, the UE may transmit a third actual repetition transmission 706 having a length of four symbols (e.g., L>4), similarly including L/2 DMRS symbols and L/2 UCI symbols (e.g., 2 DMRS and 2 UCI symbols). Thus, in this example, the UE may use the N"×N" OCC matrix 740 (where N"=2) and the M"×M" OCC matrix 728 (where M"=2) to encode the DMRS and uplink control information symbols. In this example, the base station has configured the UE to use first vector 730 [A"_1-A"_M"] of the M"×M" OCC matrix 728 to encode the UCI symbols, and second vector 742 [B"_1-B"_N"] of the N"×N" OCC matrix 740 to encode the DMRS symbols. While the illustrated example only illustrates three PUCCH repetitions, the total number of PUCCH repetitions may be different in other examples (such as illustrated in the examples of FIGS. 4A-4D).

However, problems may arise when the base station assigns a particular OCC index (e.g., i, j) to a UE, and that OCC index corresponds to a relatively larger OCC matrix (e.g., M×M OCC matrix 720 or N×N OCC matrix 732) of the multiple OCC matrices (e.g., OCC matrices 720, 724, 728 or OCC matrices 732, 736, 740). For example, if the assigned OCC index is that of a relatively larger OCC matrix, the UE may not be able to find a vector having a common OCC index in one of the relatively smaller OCC matrices because a value of the assigned OCC index may be greater than the highest value index of a smaller OCC matrix. In other words, the smaller OCC matrix may not be large enough to include a vector corresponding to the assigned OCC index. Thus, the assigned OCC index may be an out-of-bounds value for one or more of the smaller matrices. As an example, a problem may arise if the value assigned for i or j exceeds the maximum OCC index available in the smaller M"×M" OCC matrix 728 or N"×N" OCC matrix 740.

In some examples, the base station may resolve the issue of the out-of-bounds OCC index by determining a minimum cardinality of indices among the multiple OCC matrices. For example, the base station may determine the minimum cardinality of indices by determining a smallest OCC matrix size of one or more of DMRS matrices (e.g., N" in the example of FIG. 7) and UCI matrices (e.g., M" in the example of FIG. 7), then determine a range of indices available in the smallest OCC matrix. For example, in the aforementioned example of FIG. 7 where N=M=4, N'=M'=5, and N"=M"=2, then the range of indices is 2 since the smallest OCC matrix has a length of 2 (e.g., M"=2 or N"=2). Because the range of indices belongs to the smallest OCC matrix, the same indices also exist in all of the other OCC matrices with which the UE is configured. As such, the minimum cardinality of indices may only include OCC indices that are common among the DMRS matrices and/or the uplink data matrices. For example, with N" and M" being the smallest of the matrices, the base station may assign the UE with indices associated with N" and M" (e.g. i" and j") because the same indices can be found in the larger matrices (e.g., i" and j" can be found in any of the OCC matrices 720, 724, 728 or OCC matrices 732, 736, 740, respectively). Here, N' is a length of a first DMRS matrix, N is a length of a second DMRS matrix (e.g., the second matrix 520 of FIG. 5), and N" is a length of a third DMRS matrix. Similarly, M' is a length of a first UCI matrix, M is a length of a second UCI matrix (e.g., the first matrix 518 of FIG. 5), and M" is a length of a third UCI matrix.

However, the use of the minimum cardinality of indices can result in significant limitations on the base station's ability to multiplex multiple UEs at the same time because the number of UEs capable of transmitting at the same time depends a length of the matrices. Thus, if the base station determines the indices based on the matrices having the smallest length, then the number of UEs that can be scheduled to transmit at the same time may be too small.

For example, referring back to FIG. 4B, a base station may configure multiple UEs to repeat uplink transmissions where L=4 (e.g., the length of a transmission by each UE is 4 symbols), S=4 (e.g., the starting symbol is 4), and K=4 (e.g., the respective uplink transmissions will be repeated 4 times). As illustrated, such a configuration provides for two nominal repetitions of an uplink transmission (e.g., first nominal repetition 422 and second nominal repetition 424) and one actual repetition of the uplink transmission (e.g., third actual repetition 426) in a first slot 402b. Assuming each uplink repetition includes L/2 UCI symbols in this example (e.g., 2 symbols), the base station would be capable of decoding repeated uplink transmissions of UCI from up to two UEs during the first nominal repetition 422 and the second nominal repetition 424 if each of the two UEs encoded their transmissions using a different OCC index of a M'×M' DMRS matrix, where M'=2. However, the base station would only be capable of decoding uplink transmissions from up to one UE during the third actual repetition 426 because the third actual repetition is only two symbols in length (and thus only L/2=1 UCI symbol in length with M'=1). Thus, using the minimum cardinality of indices, the base station may only schedule up to one UE for repeated uplink transmissions during both the nominal and actual repetitions of the first slot instead of up to two UEs for at least the nominal repetitions. This scheduling limitation may result from the base station determining the matrix indices it assigns to the UEs based on the which OCC matrix has a length that is equal to the smallest symbol length of the nominal and actual repetitions. Here, because the third actual repetition 426 is one UCI symbol in length, the base station may assign one UE with OCC indices of a M"×M" DMRS matrix, where M"=1.

However, if the base station scheduled more than one UE for uplink transmission in the third actual repetition, then the UEs would share an OCC index, resulting in interference and signal cancelation due to multiple UEs using the same code (e.g., no orthogonality between each of the UEs). Moreover, UE power would be wasted transmitting interfering uplink transmissions. As such, scheduling UEs for uplink transmission using the minimum cardinality of indices may limit the number of UEs that transmit during a slot despite the base station being capable of properly receiving and decoding uplink transmissions from additional UEs during nominal repetitions.

Thus, aspects of the disclosure are directed to multiplexing N UEs in nominal repetitions, and minimally reducing the number of UEs multiplexed in smaller actual repetitions. This allows the UEs (which otherwise would have had their uplink transmissions subject to interference) to save their power by not transmitting over certain symbols (e.g., an actual repetition), while also providing for a maximum possible number of UEs transmitting during a nominal repetition. Accordingly, the number of UEs transmitting uplink repetitions may no longer be limited by a number of symbols in a smallest actual repetition.

Examples of Enhanced Uplink Transmission Repetitions

Figure 8:
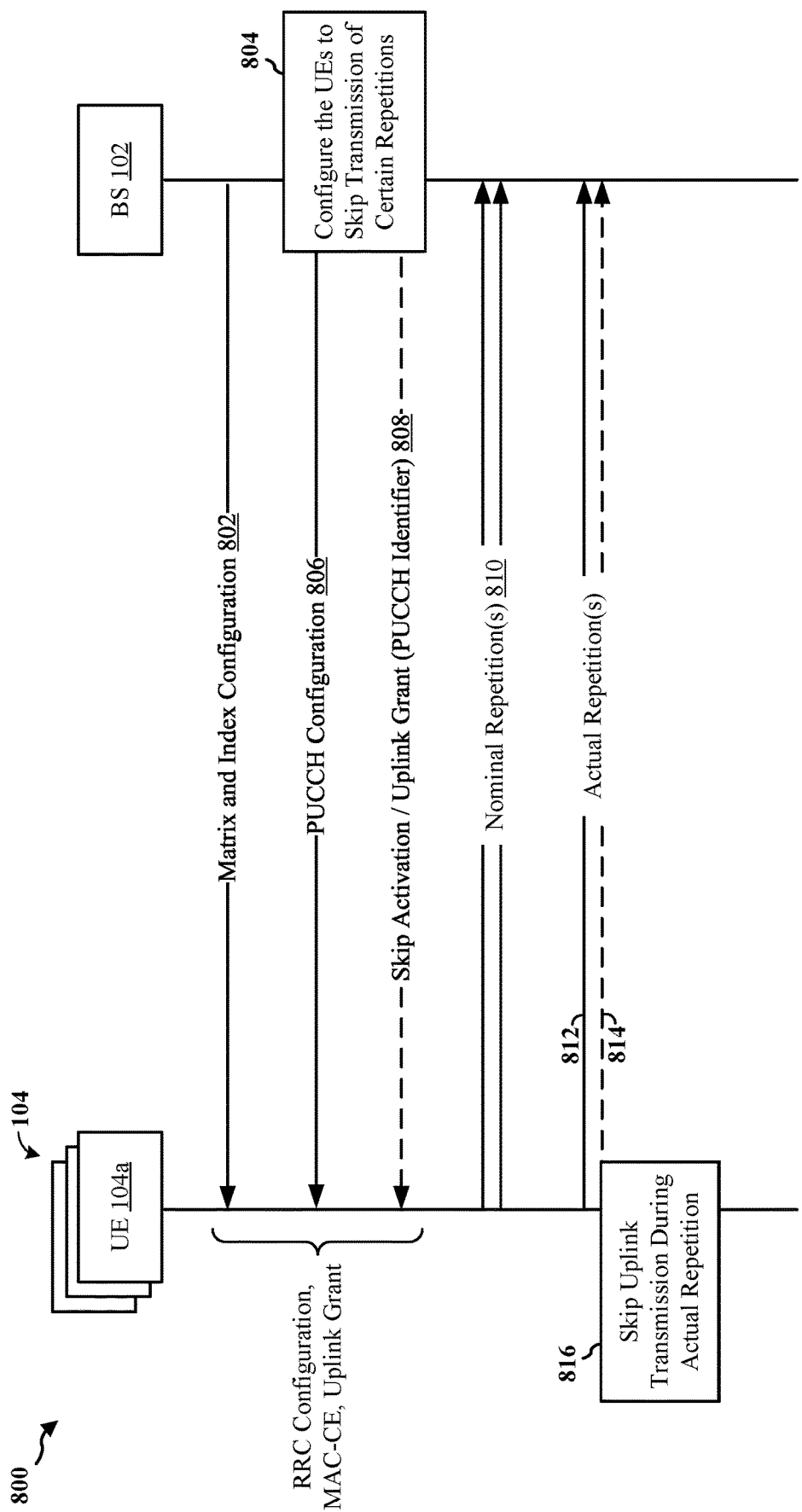
FIG. 8 is a call-flow diagram illustrating example communications between a base station and a plurality of UEs.

FIG. 8 is a call-flow diagram 800 illustrating example communications between a base station (e.g., base station 102 of FIGS. 1 and 3) and a plurality of UEs 104 (e.g., UE 104 of FIGS. 1 and 3) including at least a first UE 104a and a second UE 104b.

At a first communication 802, the base station 102 may first transmit a matrix configuration to the UEs 104 (e.g., via radio resource control (RRC) messaging, medium access control (MAC) control element (MAC-CE), downlink control information (DCI), etc.). The matrix configuration may provide the UEs 104 with a plurality of differently sized matrices for at least one of DMRS transmissions and UCI transmissions. For example, the UEs 104 may use a single set of differently sized matrices for applying OCC to both UCI and DMRS, such that each matrix in the single set can be used for both UCI and DMRS. Alternatively, the matrix configuration may provide the UEs 104 with a first set of differently sized matrices for applying OCC to UCI (e.g., M×M OCC matrix 720, M'×M' OCC matrix 724, and M"×M" OCC matrix 728 of FIG. 7), as well as a second set of differently sized matrices for applying OCC to DMRS (e.g., N×N OCC matrix 732, N'×N' OCC matrix 736, and N"×N" OCC matrix 740 of FIG. 7). In some examples, the same matrix configuration may be transmitted to each of the UEs 104.

In some examples, the base station 102 may configure one or more of the UEs 104 with a single matrix (e.g., a matrix having a length for a nominal repetition) at the first communication 802 from which the one or more UEs 104 can derive a subset matrix with a smaller length for an actual repetition. For example, referring to FIGS. 9A-9B, the base station 102 may configure the UEs 104 with an N×N OCC matrix 902, 952 having N vectors (including vector index j) that the UEs 104 may use to encode a nominal repetition. The base station 102 may also provide the UEs 104 with an indication of a starting vector 906, 956 having a first index (s), and an indication of the subset matrix 904, 954 based on localized (FIG. 9A) or distributed (FIG. 9B) vectors of the N×N OCC matrix 902, 952. While the following discussion of FIGS. 9A-9B describes illustrations of N×N OCC vectors, matrices, and subset matrices for applying OCC to DMRS symbols, it should be understood that the following discussion may similarly apply to M×M OCC vectors, matrices, and subset matrices for applying OCC to UCI symbols.

Figures 9A, 9B:
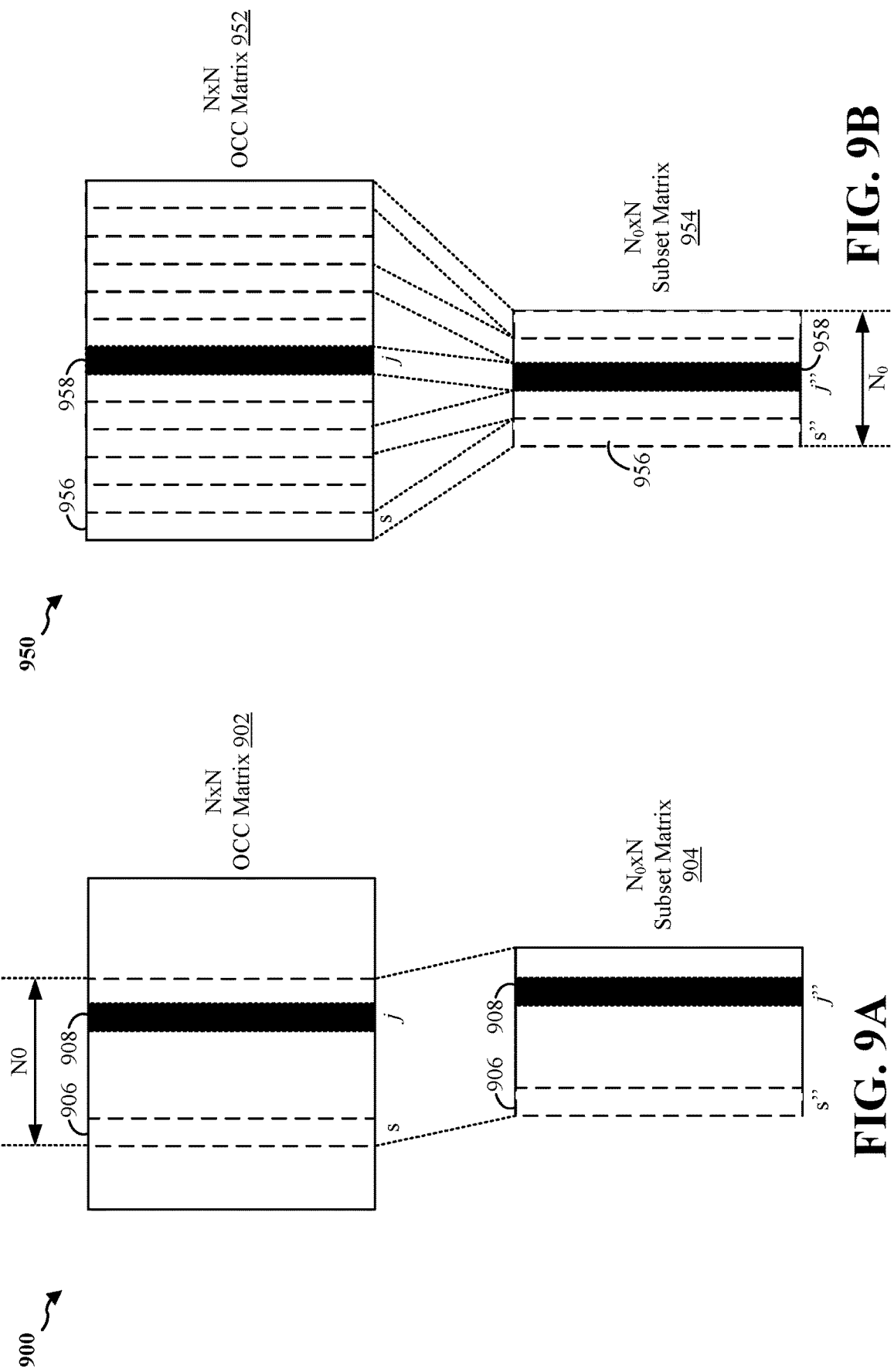
FIGS. 9A-9B respectively illustrate a first example of a subset matrix based on localized vectors and a second example of a subset matrix based on distributed vectors.

FIGS. 9A and 9B respectively illustrate a first example 900 of subset matrix 904 based on localized vectors and a second example 950 of subset matrix 954 based on distributed vectors. While these examples specifically refer to DMRS, it should be understood that similar examples may refer to UCI. In the first example 900, the starting vector 906 forms the first vector of the subset matrix 904. However, the starting vector 906 may not necessarily be the first vector of the N×N OCC matrix 902, such as illustrated in FIG. 9A. Thus, while the starting vector 906 may be the same vector in each of the N×N OCC matrix 902 and the subset matrix 904, the starting vector 906 may have different indices (e.g., s and s") across the two matrices.

In this example of FIG. 9A, the first UE 104a may derive the subset matrix 904 when it intends to transmit an actual repetition that has fewer symbols (e.g., $N_0$ DMRS symbols) than that of a nominal repetition (e.g., N DMRS symbols). Thus, the UE may derive the subset matrix 904 based on the number of symbols ($N_0$) of the actual repetition and an indication of whether the subset matrix is localized or distributed. In this example, because the subset matrix 904 is localized, the first UE 104a determines the subset matrix to include each contiguous OCC vector in the N×N OCC matrix 902 from the starting vector 906 until the total number of vectors in the subset matrix is equal to $N_0$.

In the second example 950 of FIG. 9B, the first UE 104a may derive subset matrix 954 (e.g., a distributed subset matrix) using vectors that are not contiguous in the original N×N OCC matrix 952. In the example illustrated, the starting vector 956 is the first vector for both of the N×N OCC matrix 952 and the subset matrix 954, although the starting vector 956 may be different in other examples. Thus in this example, both vectors may share the same index (e.g., s=s"). Here, the original N×N OCC matrix 952 has a length of 14 (e.g., N=14) vectors, and the subset matrix has a length of 5 vectors (e.g., $N_0$=5). To determine the distributed subset matrix 954, the first UE 104a may first determine how many vector gaps to use between vectors that will form part of the subset matrix. Part of the gap determination may include a determination of whether to use a ceiling function (e.g., $\lceil N/N_0 \rceil$) or a floor function (e.g., $\lfloor N/N_0 \rfloor$) to calculate the vector gaps. In this example, the first UE 104a may apply a floor function, where floor($N/N_0$) is equal to 2 (e.g., floor (14/5)=2) and thus every third vector of the N×N OCC matrix 952 is incorporated into the subset matrix 954. Thus, the first UE 104a may select the starting vector 956 as the first vector of the subset matrix 954, then select the next vector that occurs 3 vectors after the starting vector 956. In this manner, a vector 958 having an index of 6 (e.g., j=6) in the N×N OCC matrix 952 may have an index of 2 (e.g., j"=2) in the subset matrix 954. Alternatively, the first UE 104a may instead apply a ceiling function to determine the subset matrix. Using the illustrated example, ceil($N/N_0$) is equal to 3 (e.g., ceil(14/5)=3), and thus, the first UE 104a would incorporate every fourth vector of the N×N OCC matrix 952 into the subset matrix 954.

Referring back to FIG. 8, at a first process 804, the base station 102 may configure one or more of the UEs 104 to skip certain repetitions of their uplink transmissions. As part of the first process 804, the base station 102 may transmit a second communication 806, where the base station 102 may transmit, to the UEs 104, a PUCCH configuration. The PUCCH configuration may be transmitted to the UEs 104 via RRC, MAC-CE, uplink grant (e.g., DCI), or any other suitable signaling. In some examples, a different PUCCH configuration may be transmitted to each of the UEs 104. That is, each of the UEs 104 may receive a different configuration for transmission of uplink repetitions.

A PUCCH configuration may include an indication of one or more of: (i) resources over which each of the UEs 104 may transmit uplink repetitions, (ii) a threshold number of symbols for skipping a repetition, (iii) a format of the uplink transmission, and (iv) an OCC vector index (e.g., i or j in FIG. 7), and (v) a start vector index for a subset matrix (e.g., starting vector 906, 956). In some examples, the resources over which the UEs 104 may transmit uplink repetitions may be time resources (e.g., configured based on a slot index, a starting symbol (S), a length of each uplink transmission (L), a number of nominal repetitions (K), etc.) and frequency resources (e.g., configured based on a channel and/or bandwidth part (BWP) of the channel, etc.) that the UEs 104 may use for transmitting the uplink repetitions. In some examples, each of the UEs 104 may receive an indication of the same resources, and thus, each of the UEs 104 may transmit uplink repetitions over the same resources.

The threshold number of symbols for skipping a repetition may indicate a minimum number of symbols over which one or more of the UEs 104 may transmit an uplink repetition. For example, if the threshold number is 3 symbols, then the one or more UEs 104 may transmit a nominal repetition or an actual repetition so long as the nominal repetition or the actual repetition includes 3 or more symbols (e.g., L>3). However, if an actual repetition is less than the 3 symbol threshold, then the one or more UEs 104 may skip that actual repetition (e.g., omit an uplink repetition transmission over the resources configured for that actual repetition). In some examples, the base station 102 may provide a threshold number of symbols to less than all of the UEs 104. That is, one or more of the UEs 104 may be configured to skip a repetition, while other of the UEs may not be configured to skip a repetition. In some examples, instead of configuring a threshold number of symbols for skipping, the base station 102 may configure the UE by indicating a threshold number of allocated PUCCH resource blocks (RBs). For example, if the threshold number is 3 RBs, then the one or more UEs 104 may transmit a nominal repetition or an actual repetition so long as the resources allocated for the nominal repetition or the actual repetition is 3 or more RBs. However, if the allocated PUCCH RBs of an actual repetition are less than the 3 RB threshold, then the one or more UEs 104 may skip that actual repetition (e.g., omit an uplink repetition transmission over the resources for that actual repetition). Similarly, in addition to determining whether or not to skip an actual repetition based on the number of allocated PUCCH RBs, the UE may similarly determine whether or not to skip an actual repetition based on a maximum number of RBs configured by the base station. Moreover, different PUCCH resource configurations may be pre-configured with different threshold numbers of symbols, and the UE may similarly determine whether or not to skip an actual repetition based on the threshold number of symbols indicated in whichever PUCCH resource configuration the base station applies from the pre-configured configurations.

In some examples, the PUCCH configuration may indicate a threshold priority of an uplink repetition. For example, the one or more UEs 104 may transmit a nominal repetition or an actual repetition so long as UCI being transmitted over the nominal repetition or the actual repetition is equal to or greater than the threshold priority. However, if the UCI of an actual repetition does not meet the priority threshold, then the one or more UEs 104 may skip that actual repetition (e.g., omit an uplink repetition transmission over the resources configured for that actual repetition). In some examples, the base station may configure the one or more UEs 104 with multiple threshold numbers of symbols for skipping and/or multiple threshold numbers of RBs for skipping, wherein each of the thresholds correspond to a different priority. Thus, a UE may skip an uplink transmission if the transmission does not meet the number of symbols and/or the number of RBs for a corresponding priority of that transmission.

The PUCCH configuration may indicate a PUCCH format that the UEs 104 may use for uplink repetition transmissions over the indicated resources. In the various examples of the present disclosure, the PUCCH format may be one which supports UE multiplexing in a same physical resource block. For example, the configuration may indicate the UE to transmit PUCCH repetitions using PUCCH format 1, PUCCH format 4, or other PUCCH format which may support UE multiplexing.

The OCC vector index may indicate a particular OCC matrix index that each of the UEs 104 may use for encoding their respective uplink transmissions. The base station 102 may provide a unique OCC matrix index to the UEs 104 such that each of the UEs 104 receives an index that is different from the other UEs. For example, the base station may provide the first UE 104a with a first index, and the second UE 104b with a second index. The first and second indices may correspond to the same OCC matrix.

The OCC vector index may correspond to an index that the UEs 104 may use to encode a nominal repetition. In one example, if the UEs 104 are configured to use the same OCC matrix for encoding both DMRS symbols and UCI symbols of their respective uplink transmissions, then the index may correspond to an OCC matrix that has a dimension (e.g., N+M) equal to the number of symbols of the nominal transmission (e.g., L=N+M). In another example, if the UEs 104 are configured to use a first OCC matrix for DMRS symbols and a second OCC matrix for UCI symbols, then the base station may provide each of the UEs with two OCC vector indices (e.g., one for the first OCC matrix, and one for the second OCC matrix). In this example, each of two OCC vector indices may correspond to an OCC matrix having a length equal to a portion of the number of symbols of the nominal transmission (e.g., L/2=M and L/2=N).

In one example, the base station 102 may configure two UEs including the first UE 104a and the second UE 104b for uplink repetition transmissions using the processes and communications discussed above. In this example, the base station configures the two UEs with the same resources for uplink repetition transmission using the same PUCCH format. Using the example of FIG. 4B, the two UEs are configured to transmit four repetitions (K=4), with each repetition having a nominal length of four symbols, and the first uplink transmission of the repetition starting at symbol index 4 of a first slot (e.g., slot 402b). In other words, two UEs are configured to transmit their respective uplink repetitions at the same time over the same frequency, with each nominal uplink transmission having 4 symbols. The base station 102 also configures the first UE 104a with a first OCC vector index $i_{Ma}$ corresponding to an M×M OCC matrix and a second OCC vector index $i_{Na}$ corresponding to an N×N OCC matrix. Similarly, the base station 102 configures the second UE 104b with a third OCC vector index $i_{Mb}$ corresponding to the M×M OCC matrix and a fourth OCC vector index $i_{Nb}$ corresponding to the N×N matrix. In this example, M=2 and N=2 (e.g., the dimensions of both matrices are 2×2). The base station 102 in this example also configures only the second UE 104b with a threshold number of symbols for skipping a repetition, where the threshold is 4 symbols.

At a third communication 810, the two UEs may transmit a first nominal repetition and a second nominal repetition (e.g., first nominal repetition 422 over symbols 4-7 of the first slot 402b, a second nominal repetition 424 over symbols 8-11 of the first slot 402b, as shown in FIG. 4B). In this example, both UEs are configured with the M×M OCC matrix and N×N OCC matrix, and each uses a different OCC vector index to encode their respective uplink transmissions. As such, the base station 102 can properly receive and decode the nominal repetition transmissions because of the orthogonality of the respective uplink transmissions.

However, the next uplink transmission is an actual repetition (e.g., third actual repetition 426 of FIG. 4B) of only two symbols in length because a slot boundary prevents a full nominal repetition. As discussed, the lower number of symbols may require the UEs to use OCC matrices with a shorter length. As such, the two UEs may switch from the M×M OCC matrix and the N×N OCC matrix to an M'×M' OCC matrix and an N'×N' OCC matrix, wherein M'=1 and N'=1 for transmission over the actual repetition. This reduction in OCC matrix size may reduce the number of UEs that may be multiplexed in the actual repetition. For instance, one of the two UEs (e.g., the first UE 104a) may transmit the actual repetition applying the OCC vector from the M'×M' OCC matrix and N'×N' OCC matrix, while the remaining of the two UEs (e.g., the second UE 104b) may skip the actual repetition to avoid applying a duplicate OCC vector (thereby reducing interference). Alternatively, the second UE may not skip the actual repetition and instead overload the resources of the actual repetition by applying the same OCC vector as the first UE. In either example, in contrast to the minimal cardinality of the indices approach described above, here the second UE may not be restricted from transmitting the nominal repetitions in the same resources as the first UE. Thus, the maximum amount of UEs capable of being multiplexed in nominal repetitions may no longer be limited by the OCC matrix size for subsequent actual repetitions.

In this example, because the actual repetition is only two symbols, the first UE may transmit a DMRS symbol encoded using the N'×N' OCC matrix, and a UCI symbol encoded using the M'×M' OCC matrix. Thus, in one example, the first UE 104a may determine the first vector index $i_{M'a}$ for the M'×M' OCC matrix using a function of the first vector index $i_{Ma}$ from the M×M OCC matrix (e.g., the first OCC vector) and a size of the second OCC matrix (e.g., M'), for example, using modulus Equation 1 below. Similarly, the first UE 104a may determine a second vector index $i_{N'a}$ for the N'×N' OCC matrix using a function of the second vector index $i_{Na}$ from the N×N OCC matrix (e.g., the second OCC vector) and a size of the second OCC matrix (e.g., N'), for example, using modulus Equation 2 below.

$$i_{M'a} = i_{Ma} \bmod(M') \qquad \text{Equation 1}$$

$$i_{N'a} = i_{Na} \bmod(N') \qquad \text{Equation 2}$$

The aforementioned equations are merely examples; the first UE 104 may apply other pre-configured (or configured) functions to derive the smaller OCC matrix indices (e.g., based on a configured OCC index from the larger OCC matrix and a defined size of the smaller OCC matrix). These functions may be applied in order to allow the base station to avoid signaling multiple OCC indices (for different sized OCC matrices) to the UEs, reducing signaling overhead. For instance, referring to FIG. 7, rather than signaling OCC indices i, i', and i" or j, j', and j" individually, the base station may simply signal i or j, and the UE may derive i' and j', or i" and j", from the signaled OCC index. Thus, the first UE 104*a* may determine new OCC vectors for encoding DMRS and UCI portions of an uplink transmission for an actual repetition based on the OCC vectors and the size of the matrices that will be used for the actual repetition. Accordingly, the first UE 104*a* may transmit the actual repetition during a fourth communication 812.

In some examples, the second UE 104*b* may refrain from transmitting an uplink repetition in a fifth communication 814 during the same actual repetition which the first UE 104*a* transmits. Here, because the base station 102 configured the second UE 104*b* with the 4-symbol threshold for skipping a repetition, and the actual repetition is only 2-symbols in length, the second UE 104*b* may determine to skip transmitting the repetition. Thus, the second UE 104*b* may determine, in a second process 816, to skip an uplink repetition transmission during an actual repetition. That is, the uplink repetition may be skipped in response to a symbol length of the actual repetition (e.g., symbol length is 2 in this example) being less than the threshold number of symbols (e.g., threshold number of symbols is 4 in this example).

In another example, while the base station 102 may configure the second UE 104*b* with the threshold number of symbols for skipping a repetition, the second UE 104*b* may not skip the uplink transmission of the fifth communication 814 (e.g., the uplink transmission over the 2-symbol actual repetition) if it has not received an indication of skipping activation (e.g., a DCI) from the base station 102. Thus, in this example, the second UE 104*b* may continue to transmit uplink repetitions until the base station 102 activates it for skipping in DCI. For example, if the second UE does not skip repetitions and thus both of the UEs are transmitting over the actual repetition using the same OCC vector, then there may be some overlap or overload of uplink signaling over the resources of the actual repetition. Thus, in such an example, the base station 102 may attempt to decode the different uplink signals using any suitable interference canceling techniques.

As illustrated (e.g., with reference to the example of FIG. 4B), the base station 102 may transmit the skip activation (e.g., DCI) to the second UE 104*b* in a sixth communication 808 prior to the first nominal repetition 422 and the second nominal repetition 424 of the third communication 810. In response to the activation in DCI, as illustrated, the second UE 104*b* may skip the third actual repetition 426. However, if the base station 102 does not provide the sixth communication 808 or otherwise activate the second UE 104*b* for skipping, then the second UE 104*b* may transmit an uplink repetition over the resources for the actual repetition in the fifth communication 814.

In some examples, the base station 102 may transmit a skip activation that includes an indication of a period of time through which the second UE 104*b* is activated for skipping repetitions. Thus, once the period of time expires, the UE will no longer skip repetitions.

In some examples, the skip activation or the PUCCH configuration may indicate a particular resource over which the second UE 104*b* may skip repetitions. For example, the skip activation or the PUCCH configuration may include a PUCCH identifier or a PUCCH resource indicator (PRI) indicating a particular PUCCH resource over which the second UE 104*b* may not transmit an actual repetition.

Figure 10:
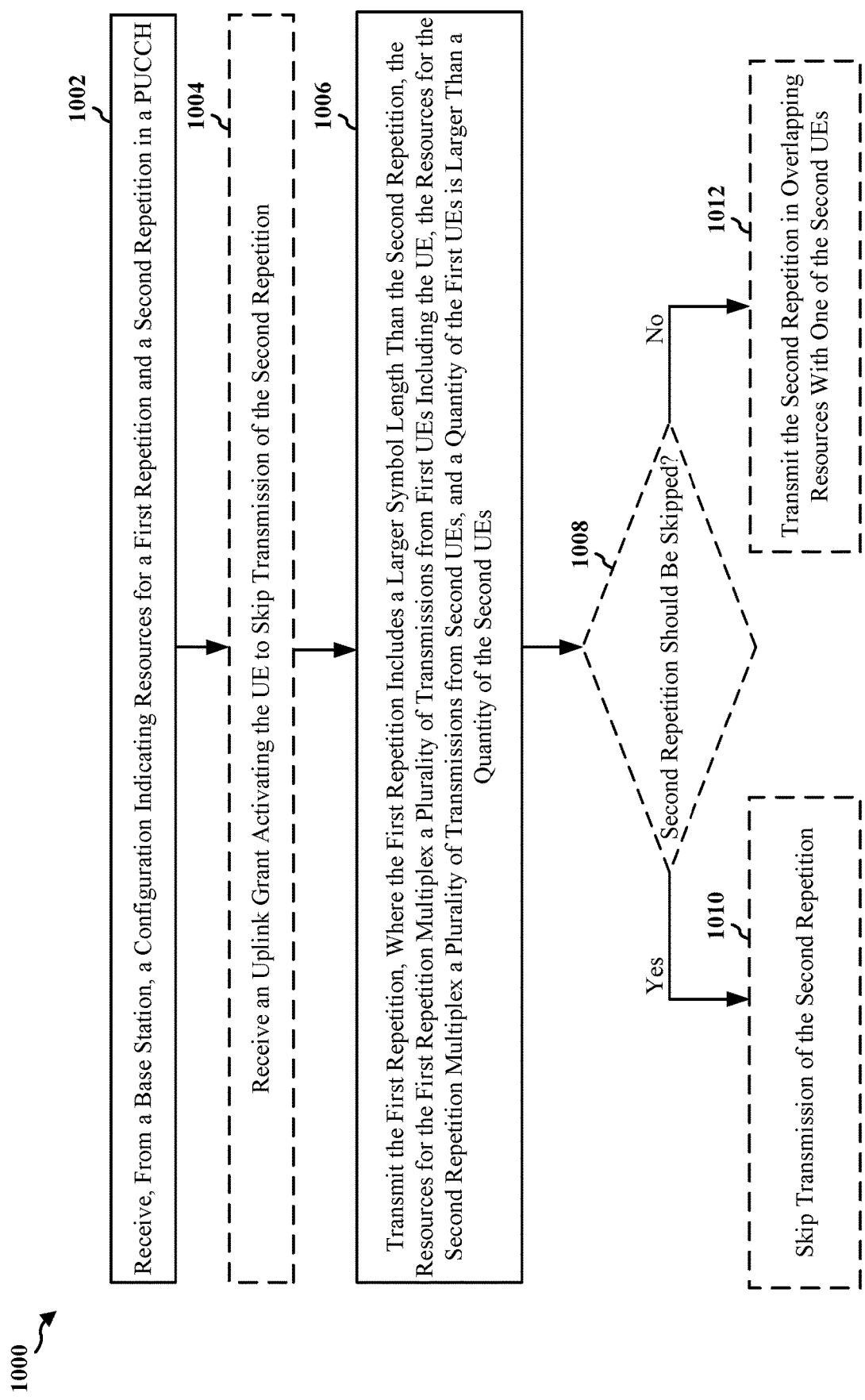
FIG. 10 is a flowchart of a method of wireless communication.

FIG. 10 is a flowchart 1000 of a method of wireless communication. The method may be performed by a UE (e.g., the UE 104 of FIGS. 1 and 3; the apparatus 1202 of FIG. 12). Optional aspects are illustrated in dashed lines. The method allows a UE to transmit nominal PUCCH repetitions which are multiplexed with repetitions of other UEs in situations where the UE may skip transmission of actual PUCCH repetitions.

At a first step 1002, the UE may receive, from a base station, a configuration indicating resources for a first repetition and a second repetition in a physical uplink control channel (PUCCH). For example, the first step 1002 may be performed by a configuration component 1240. The first repetition may be a nominal repetition, while the second repetition may be an actual repetition. For instance, referring to the aforementioned Figures, the UE 104 may receive from base station 102 a configuration (e.g., in first communication 802 and/or second communication 806) indicating resources (e.g., symbols, and/or RBs, of slots 402*a*, 402*b*, 402*c*, 402*d*) in which the UE may transmit a first repetition (e.g., first nominal repetition 422 in FIG. 4B) and a second repetition (e.g., third actual repetition 426 in FIG. 4B) in a PUCCH. Specifically, the UE may receive an indication of time and frequency resources that the UE may use to transmit a repetition of an uplink signal. The configuration may further include one or more orthogonal cover code (OCC) matrices and an indication of which OCC vector of the matrices to use.

In certain aspects, the PUCCH includes a format associated with UE multiplexing. For example, the PUCCH configuration (e.g., received in second communication 806) may indicate a PUCCH format that the UE 104 may apply to first nominal repetition 422 and third actual repetition 426 in the aforementioned resources. In the various examples of the present disclosure, the PUCCH format may be one which supports UE multiplexing in a same physical resource block. For example, the configuration may indicate the UE to transmit PUCCH repetitions using PUCCH format 1, PUCCH format 4, or other PUCCH format which may support UE multiplexing.

At a second step 1004, the UE may optionally receive an uplink grant activating the UE to skip transmission of the second repetition. For example, the second step 1004 may be performed by an activation component 1242. For instance, referring to the aforementioned Figures, the UE 104 may receive sixth communication 808 (e.g., an uplink grant or DCI) from base station 102 activating the UE to skip transmission of the second repetition (e.g., the third actual repetition 426 in FIG. 4B). In certain aspects, the uplink grant indicates a PUCCH identifier, and the transmission of second repetition is skipped in response to the PUCCH identifier being associated with the resources for the second repetition. For instance, in some examples, the skip activation or the PUCCH configuration may indicate a particular resource over which the second UE 104*b* may skip repetitions. For example, the skip activation or the PUCCH configuration may include a PUCCH identifier or a PRI indicating a particular PUCCH resource over which the second UE 104*b* may not transmit an actual repetition.

At a third step 1006, the UE may transmit the first repetition, where the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs. For example, the third step 1006 may be performed by a repetition component 1244. For instance, referring to the aforementioned Figures, the UE 104 may transmit in third communication 810 the first repetition (e.g., first nominal repetition 422), where the first repetition includes a larger symbol length than the second repetition (e.g., first nominal repetition 422 may be 4 symbols while third actual repetition 426 may be 2 symbols). The resources (e.g., symbols, RBs) for the first repetition (e.g., the nominal repetition) may multiplex a plurality of transmissions from first UEs (e.g., UEs 104a-104n) including the UE 104, such as described and illustrated above with respect to FIG. 5. Specifically, a first UE may transmit OCC encoded data (e.g., UCI) and DMRS symbols using one or more OCC vectors from the one or more OCC matrices, and a second UE may transmit OCC encoded data and DMRS symbols in the same symbols using another one or more OCC vectors. Thus, because the transmissions (e.g., nominal repetitions) of the first UE and the second UE are orthogonal, the base station is able to properly receive and decode them. The transmission of the first UE and the second UE are thus resource multiplexed. Moreover, the resources (e.g., symbols, RBs) for the second repetition (e.g., the actual repetition) may multiplex a plurality of transmissions from second UEs (e.g., a subset of UEs 104a-104n), where the quantity of first UEs is larger than the quantity of second UEs. For example, referring to FIG. 4B, while 2 UEs may transmit first nominal repetition 422 in overlapping resources, only 1 UE may transmit in resources of actual repetition 426 since the actual repetition has a smaller symbol length (and thus is associated with a smaller OCC matrix) than that of the nominal repetition.

In certain aspects, the resources for the first repetition may be associated with a first orthogonal cover code (OCC) vector, the resources for the second repetition may be associated with a second OCC vector, the first OCC vector may be associated with a first vector index in a first OCC matrix, and the second OCC vector may be associated with a second vector index in a second OCC matrix. In certain aspects, the second vector index may be a function of the first vector index and a size of the second OCC matrix. For instance, referring to the aforementioned Figures such as illustrated in FIG. 7, the resources (e.g., symbols, RBs) for the first nominal repetition 422 are associated with vector 722 (e.g., elements of this first OCC vector are respectively applied to symbols/RBs of the nominal repetition), and the resources (e.g., symbols, RBs) of the third actual repetition 426 are associated with vector 730 (e.g., elements of this second OCC vector are respectively applied to symbols/RBs of the actual repetition). The vector 722 is associated with a first vector index (e.g., OCC index i) in M×M OCC matrix 720, and the vector 730 is associated with a second vector index (e.g. OCC index i") in M"×M" OCC matrix 728. The OCC index of vector 730 may be a function of the OCC index of vector 722 and of a size of the M"×M" OCC matrix 728, such as described above with respect to Equations 1 and 2.

In certain aspects, the resources for the first repetition may be associated with a first orthogonal cover code (OCC) vector, the resources for the second repetition may be associated with a second OCC vector, the first OCC vector may be associated with a first vector index in a first OCC matrix, and the second OCC vector may be associated with a second vector index in a subset of the first OCC matrix. For instance, referring to the aforementioned Figures such as illustrated in FIGS. 9A-9B, the resources (e.g., symbols, RBs) for the first nominal repetition 422 are associated with vector 908, 958 in the N×N OCC matrix 902, 952 (e.g., elements of the vector given by index j in FIGS. 9A/9B are respectively applied to symbols/RBs of the nominal repetition such as illustrated in FIG. 7). Moreover, the resources (e.g., symbols, RBs) for the third actual repetition 426 are associated with vector 908 in the $N_0 \times N$ subset matrix 904, 954 (e.g., elements of the vector given by index j" in FIGS. 9A/9B are respectively applied to symbols/RBs of the actual repetition such as illustrated in FIG. 7). The vector 908 in the N×N OCC matrix 902, 952 may be associated with a first vector index (e.g., OCC index j), and the vector 908 in the $N_0 \times N$ subset matrix 904, 954 may be associated with a second vector index (e.g., OCC index j").

In certain aspects, the configuration may include a start vector index, the subset of the first OCC matrix may include contiguous or non-contiguous vectors from the first OCC matrix, and the contiguous or non-contiguous vectors may be associated with indices starting with the start vector index. For instance, referring to the aforementioned Figures such as illustrated in FIGS. 9A-9B, the configuration (e.g., in first communication 802 and/or second communication 806) may include a start vector index (e.g., starting vector 906, 956). The $N_0 \times N$ subset matrix 904, 954 may include contiguous vectors from the N×N OCC matrix 902 (e.g., localized as described and illustrated above with respect to FIG. 9A), or non-contiguous vectors from the N×N OCC matrix 952 (e.g., distributed as described and illustrated above with respect to FIG. 9B). Moreover, the contiguous or non-contiguous vectors of the N×N OCC matrix 902, 952 may each be associated with an OCC index (for example, j) beginning from start vector index 906, 956, such as illustrated in FIGS. 9A-9B.

At a fourth step 1008, the UE may optionally determine whether the second repetition should be skipped. For example, the fourth step 1008 may be performed by a skip component 1246. In one example, the transmission of the second repetition may be skipped based on a number of allocated PUCCH resource blocks (RBs), a maximum, configured number of PUCCH resource blocks (RBs), or a PUCCH transmission priority. In another example, the configuration (received at 1002) indicates a threshold number of symbols for skipping repetitions, and the transmission of the second repetition may be skipped in response to a symbol length of the second repetition being less than the threshold number of symbols. In certain aspects, the configuration may be a radio resource control (RRC) configuration, a medium access control (MAC) control element (MAC-CE), or an uplink grant. For example, the UE may receive a configuration indicating a symbol length and skip the repetition because the length of the second repetition is less than the indicated symbol length. In a further example, the threshold number of symbols may be a function of a number of allocated PUCCH resource blocks (RBs), a maximum, configured number of PUCCH resource blocks (RBs), or a PUCCH transmission priority. Thus, referring to the aforementioned Figures, the UE 104 may determine to skip transmitting third actual repetition 426 if one or more of the following occurs: the allocated number of RBs for the actual repetition is less than a threshold number of RBs or less than the maximum number of RBs configured for nominal repetitions (e.g., in first communication 802 and/or second communication 806), the transmission priority of the actual repetition is lower than the transmission priority of another UE in overlapping RBs, or the symbol length of the actual repetition is less than a threshold number of symbols configured in first communication 802 and/or second communication 806. In the latter case, the value of the threshold number of symbols may be configured differently (e.g., higher or lower) depending on the allocated number of RBs for the actual repetition, the maximum number of RBs configured for nominal repetitions (e.g., in first communication 802 and/or second communication 806), or the transmission priority of the actual repetition. In a further example, if an uplink grant activating skipping is received at 1004, the actual repetition may be skipped in response to this uplink grant (e.g., for a period of time indicated in the uplink grant).

At a fifth step 1010, the UE may optionally skip transmission of the second repetition. For example, the fifth step 1010 may be performed by the skip component 1246. For instance, referring to the aforementioned Figures and description, the UE 104 may skip transmission of third actual repetition 426 (e.g., refrain from transmitting UCI in fifth communication 814) in response to the determination at 1008.

In a sixth step 1012, the UE may optionally transmit the second repetition in overlapping resources with one of the second UEs. For example, the sixth step 1012 may be performed by the repetition component 1244. For instance, referring to the aforementioned Figures and description, the UE 104 may transmit third actual repetition 426 (e.g., UCI in fifth communication 814) in resources (e.g., symbols, RBs) overlapping with those of the fourth communication 812 transmitted by a different UE, in response to the determination at 1008.

Figure 11:
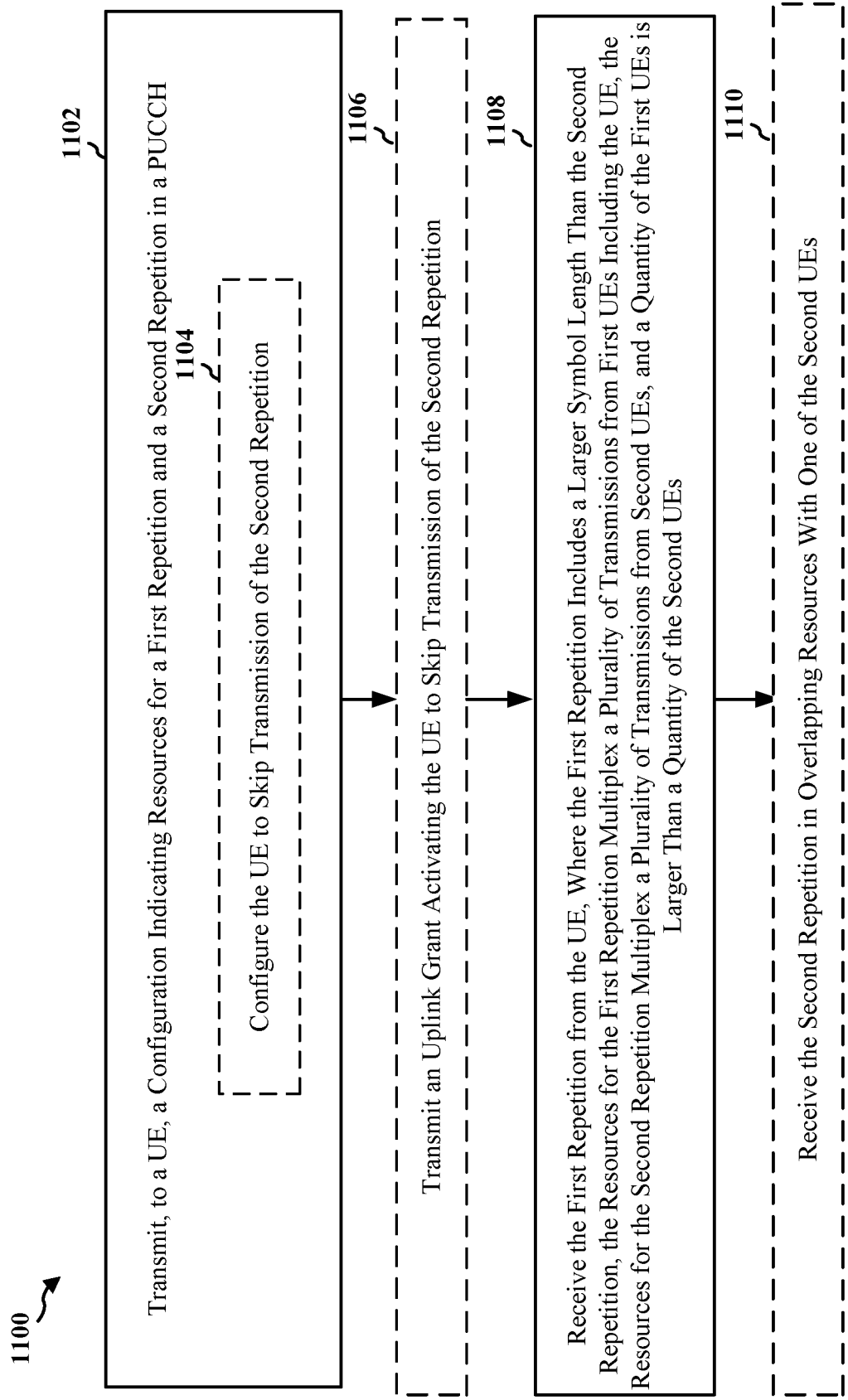
FIG. 11 is a flowchart of a method of wireless communication.

FIG. 11 is a flowchart 1100 of a method of wireless communication. The method may be performed by a base station (e.g., the BS 102/180 of FIGS. 1 and 3; the apparatus 1302 of FIG. 13). Optional aspects are illustrated in dashed lines. The method allows a base station to configure a UE to transmit nominal PUCCH repetitions which are multiplexed with repetitions of other UEs in situations where the UE may skip transmission of actual PUCCH repetitions.

At a first step 1102, the base station may transmit, to a user equipment (UE), a configuration indicating resources for a first repetition and a second repetition in a physical uplink control channel (PUCCH). For example, the first step 1102 may be performed by a configuration component 1340. The first repetition may be a nominal repetition, while the second repetition may be an actual repetition. For instance, referring to the aforementioned Figures, the UE 104 may receive from base station 102 a configuration (e.g., in first communication 802 and/or second communication 806) indicating resources (e.g., symbols, and/or RBs, of slots 402a, 402b, 402c, 402d) in which the UE may transmit a first repetition (e.g., first nominal repetition 422 in FIG. 4B) and a second repetition (e.g., third actual repetition 426 in FIG. 4B) in a PUCCH. Specifically, the UE may receive an indication of time and frequency resources that the UE may use to transmit a repetition of an uplink signal. The configuration may further include one or more orthogonal cover code (OCC) matrices and an indication of which OCC vector of the matrices to use.

In certain aspects, the PUCCH includes a format associated with UE multiplexing. For example, the PUCCH configuration (e.g., received in second communication 806) may indicate a PUCCH format that the UE 104 may apply to first nominal repetition 422 and third actual repetition 426 in the aforementioned resources. In the various examples of the present disclosure, the PUCCH format may be one which supports UE multiplexing in a same physical resource block. For example, the configuration may indicate the UE to transmit PUCCH repetitions using PUCCH format 1, PUCCH format 4, or other PUCCH format which may support UE multiplexing.

At a second step 1104, the base station may optionally configure the UE to skip transmission of the second repetition. For example, the second step 1104 may be performed by the configuration component 1340. In one example, the transmission of the second repetition may be skipped based on a number of allocated PUCCH resource blocks (RBs), a maximum, configured number of PUCCH resource blocks (RBs), or a PUCCH transmission priority. In another example, the configuration (transmitted at 1102) indicates a threshold number of symbols for skipping repetitions, and the transmission of the second repetition may be skipped in response to a symbol length of the second repetition being less than the threshold number of symbols. In certain aspects, the configuration may be a radio resource control (RRC) configuration, a medium access control (MAC) control element (MAC-CE), or an uplink grant. For example, the UE may receive a configuration indicating a symbol length and skip the repetition because the length of the second repetition is less than the indicated symbol length. In a further example, the threshold number of symbols may be a function of a number of allocated PUCCH resource blocks (RBs), a maximum, configured number of PUCCH resource blocks (RBs), or a PUCCH transmission priority. Thus, referring to the aforementioned Figures, the base station 102 may configure the UE 104 to skip transmitting third actual repetition 426 if one or more of the following occurs: the allocated number of RBs for the actual repetition is less than a threshold number of RBs or less than the maximum number of RBs configured for nominal repetitions (e.g., in first communication 802 and/or second communication 806), the transmission priority of the actual repetition is lower than the transmission priority of another UE in overlapping RBs, or the symbol length of the actual repetition is less than a threshold number of symbols configured in first communication 802 and/or second communication 806. In the latter case, the value of the threshold number of symbols may be configured differently (e.g., higher or lower) depending on the allocated number of RBs for the actual repetition, the maximum number of RBs configured for nominal repetitions (e.g., in first communication 802 and/or second communication 806), or the transmission priority of the actual repetition. In a further example, if an uplink grant activating skipping is transmitted at 1106, the actual repetition may be skipped in response to this uplink grant (e.g., for a period of time indicated in the uplink grant).

At a third step 1106, the base station may optionally transmit an uplink grant activating the UE to skip the transmission of the second repetition. For example, the third step 1106 may be performed by an activation component 1342. For instance, referring to the aforementioned Figures, the UE 104 may receive sixth communication 808 (e.g., an uplink grant or DCI) from base station 102 activating the UE to skip transmission of the second repetition (e.g., the third actual repetition 426 in FIG. 4B). In certain aspects, the uplink grant indicates a PUCCH identifier, and the transmission of second repetition is skipped in response to the PUCCH identifier being associated with the resources for the second repetition. For instance, in some examples, the skip activation or the PUCCH configuration may indicate a particular resource over which the second UE 104b may skip repetitions. For example, the skip activation or the PUCCH configuration may include a PUCCH identifier or a PRI indicating a particular PUCCH resource over which the second UE 104b may not transmit an actual repetition.

At a fourth step 1108, the base station may receive the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs. For example, the fourth step 1108 may be performed by a repetition component 1344. For instance, referring to the aforementioned Figures, the UE 104 may transmit in third communication 810 the first repetition (e.g., first nominal repetition 422), where the first repetition includes a larger symbol length than the second repetition (e.g., first nominal repetition 422 may be 4 symbols while third actual repetition 426 may be 2 symbols). The resources (e.g., symbols, RBs) for the first repetition (e.g., the nominal repetition) may multiplex a plurality of transmissions from first UEs (e.g., UEs 104a-104n) including the UE 104, such as described and illustrated above with respect to FIG. 5. Specifically, a first UE may transmit OCC encoded data (e.g., UCI) and DMRS symbols using one or more OCC vectors from the one or more OCC matrices, and a second UE may transmit OCC encoded data and DMRS symbols in the same symbols using another one or more OCC vectors. Thus, because the transmissions (e.g., nominal repetitions) of the first UE and the second UE are orthogonal, the base station is able to properly receive and decode them. The transmission of the first UE and the second UE are thus resource multiplexed. Moreover, the resources (e.g., symbols, RBs) for the second repetition (e.g., the actual repetition) may multiplex a plurality of transmissions from second UEs (e.g., a subset of UEs 104a-104n), where the quantity of first UEs is larger than the quantity of second UEs. For example, referring to FIG. 4B, while 2 UEs may transmit first nominal repetition 422 in overlapping resources, only 1 UE may transmit in resources of actual repetition 426 since the actual repetition has a smaller symbol length (and thus is associated with a smaller OCC matrix) than that of the nominal repetition.

In certain aspects, the resources for the first repetition may be associated with a first orthogonal cover code (OCC) vector, the resources for the second repetition may be associated with a second OCC vector, the first OCC vector may be associated with a first vector index in a first OCC matrix, and the second OCC vector may be associated with a second vector index in a second OCC matrix. In certain aspects, the second vector index may be a function of the first vector index and a size of the second OCC matrix. For instance, referring to the aforementioned Figures such as illustrated in FIG. 7, the resources (e.g., symbols, RBs) for the first nominal repetition 422 are associated with vector 722 (e.g., elements of this first OCC vector are respectively applied to symbols/RBs of the nominal repetition), and the resources (e.g., symbols, RBs) of the third actual repetition 426 are associated with vector 730 (e.g., elements of this second OCC vector are respectively applied to symbols/RBs of the actual repetition). The vector 722 is associated with a first vector index (e.g., OCC index i) in M×M OCC matrix 720, and the vector 730 is associated with a second vector index (e.g. OCC index i") in M"×M" OCC matrix 728. The OCC index of vector 730 may be a function of the OCC index of vector 722 and of a size of the M"×M" OCC matrix 728, such as described above with respect to Equations 1 and 2.

In certain aspects, the resources for the first repetition may be associated with a first orthogonal cover code (OCC) vector, the resources for the second repetition may be associated with a second OCC vector, the first OCC vector may be associated with a first vector index in a first OCC matrix, and the second OCC vector may be associated with a second vector index in a subset of the first OCC matrix. For instance, referring to the aforementioned Figures such as illustrated in FIGS. 9A-9B, the resources (e.g., symbols, RBs) for the first nominal repetition 422 are associated with vector 908, 958 in the N×N OCC matrix 902, 952 (e.g., elements of the vector given by index j in FIGS. 9A/9B are respectively applied to symbols/RBs of the nominal repetition such as illustrated in FIG. 7). Moreover, the resources (e.g., symbols, RBs) for the third actual repetition 426 are associated with vector 908 in the $N_0 \times N$ subset matrix 904, 954 (e.g., elements of the vector given by index j" in FIGS. 9A/9B are respectively applied to symbols/RBs of the actual repetition such as illustrated in FIG. 7). The vector 908 in the N×N OCC matrix 902, 952 may be associated with a first vector index (e.g., OCC index j), and the vector 908 in the $N_0 \times N$ subset matrix 904, 954 may be associated with a second vector index (e.g., OCC index j").

In certain aspects, the configuration may include a start vector index, the subset of the first OCC matrix may include contiguous or non-contiguous vectors from the first OCC matrix, and the contiguous or non-contiguous vectors may be associated with indices starting with the start vector index. For instance, referring to the aforementioned Figures such as illustrated in FIGS. 9A-9B, the configuration (e.g., in first communication 802 and/or second communication 806) may include a start vector index (e.g., starting vector 906, 956). The $N_0 \times N$ subset matrix 904, 954 may include contiguous vectors from the N×N OCC matrix 902 (e.g., localized as described and illustrated above with respect to FIG. 9A), or non-contiguous vectors from the N×N OCC matrix 952 (e.g., distributed as described and illustrated above with respect to FIG. 9B). Moreover, the contiguous or non-contiguous vectors of the N×N OCC matrix 902, 952 may each be associated with an OCC index (for example, j) beginning from start vector index 906, 956, such as illustrated in FIGS. 9A-9B.

At a fifth step 1110, the base station may optionally receive the second repetition from the UE in overlapping resources with one of the second UEs. For example, the fifth step 1110 may be performed by the repetition component 1344. For instance, referring to the aforementioned Figures and description, the UE 104 may transmit third actual repetition 426 (e.g., UCI in fifth communication 814) in resources (e.g., symbols, RBs) overlapping with those of the fourth communication 812 transmitted by a different UE.

Figure 12:
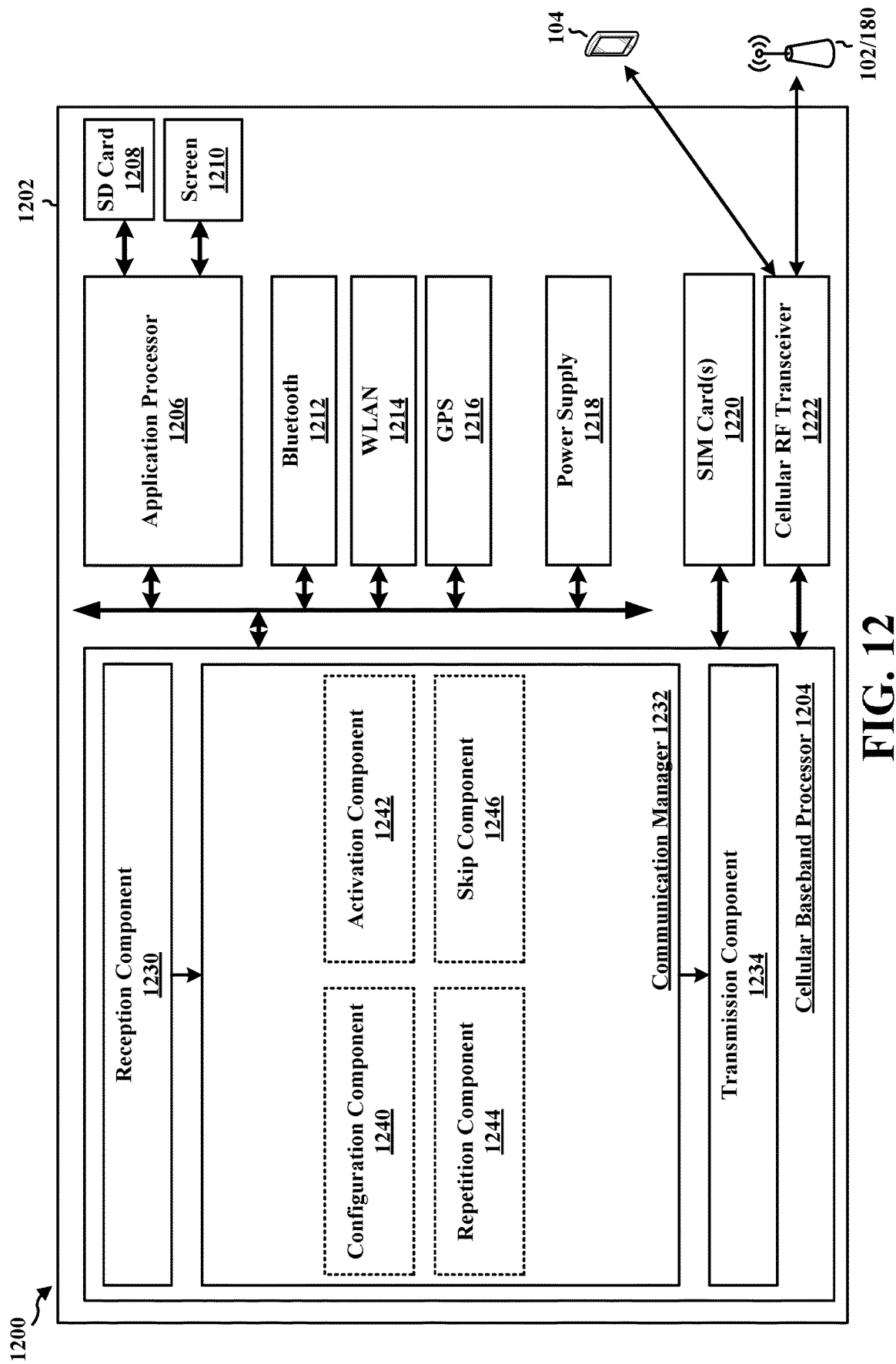
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 104 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 104 of FIGS. 1 and 3) and include the aforementioned additional modules of the apparatus 1202.

The communication manager 1232 includes a configuration component 1240 that is configured to receive, from a base station, a configuration indicating resources for a first repetition and a second repetition in a physical uplink control channel (PUCCH); e.g., as described in connection with the first step 1002 of FIG. 10.

The communication manager 1232 further includes an activation component 1242 that is configured to receive an uplink grant activating the UE to skip transmission of the second repetition; e.g., as described in connection with the second step 1004 of FIG. 10.

The communication manager 1232 further includes a repetition component 1244 that is configured to transmit the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs; e.g., as described in connection with the third step 1006 of FIG. 10. The repetition component 1244 may also be configured to transmit the second repetition in overlapping resources with one of the second UEs; e.g., as described in connection with the sixth step 1012 of FIG. 10.

The communication manager 1232 further includes a skip component 1246 that is configured to determine whether the second repetition should be skipped; e.g., as described in connection with the fourth step 1008. The skip component 1246 may also be configured to skip transmission of the second repetition; e.g., as described in connection with the fifth step 1010 of FIG. 10.

The apparatus may include additional components that perform each of the blocks of the algorithm in the aforementioned flowchart of FIG. 10. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a base station, a configuration indicating resources for a first repetition and a second repetition in a physical uplink control channel (PUCCH); and means for transmitting the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

In one configuration, the apparatus 1202, and in particular the cellular baseband processor 1204, may include means for skipping transmission of the second repetition.

In one configuration, the apparatus 1202, and in particular the cellular baseband processor 1204, may include means for receiving an uplink grant activating the UE to skip the transmission of the second repetition.

In one configuration, the apparatus 1202, and in particular the cellular baseband processor 1204, may include means for transmitting the second repetition in overlapping resources with one of the second UEs.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
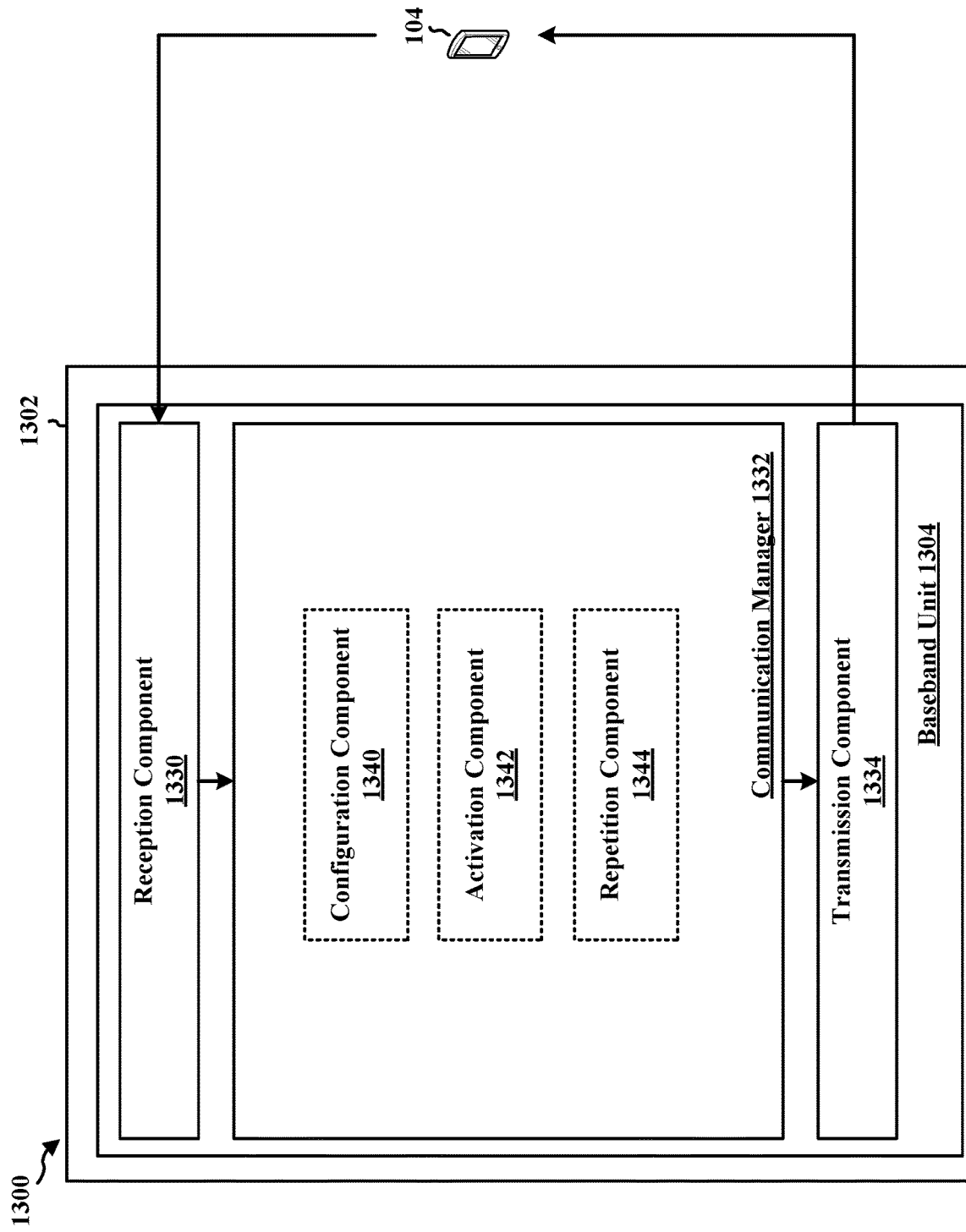
FIG. 13 is a diagram illustrating another example of a hardware implementation for another example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 102 and may include the memory 376 and/or at least one of the TX processor 316, the RX processor 370, and the controller/processor 375.

The communication manager 1332 includes a configuration component 1340 that is configured to transmit, to a user equipment (UE), a configuration indicating resources for a first repetition and a second repetition in a physical uplink control channel (PUCCH); and configure the UE to skip transmission of the second repetition; e.g., as described in connection with the first step 1102 and the second step 1104 of FIG. 11.

The communication manager 1332 further includes an activation component 1342 that is configured to transmit an uplink grant activating the UE to skip the transmission of the second repetition; e.g., as described in connection with the third step 1106 of FIG. 11.

The communication manager 1332 further includes a repetition component 1344 configured to receive the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs; e.g., as described in connection with the fourth step 1108 of FIG. 11. The repetition component 1344 is also configured to receive the second repetition from the UE in overlapping resources with one of the second UEs, e.g., as described in connection with the fifth step 1110 of FIG. 11.

The apparatus may include additional components that perform each of the blocks of the algorithm in the aforementioned flowchart of FIG. 11. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a user equipment (UE), a configuration indicating resources for a first repetition and a second repetition in a physical uplink control channel (PUCCH); and means for receiving the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

In one configuration, the apparatus 1302, and in particular the baseband unit 1304, may include means for configuring the UE to skip transmission of the second repetition.

In one configuration, the apparatus 1302, and in particular the baseband unit 1304, may include means for transmitting an uplink grant activating the UE to skip the transmission of the second repetition.

In one configuration, the apparatus 1302, and in particular the baseband unit 1304, may include means for receiving the second repetition from the UE in overlapping resources with one of the second UEs.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is a method of wireless communication at a user equipment (UE), comprising: receiving, from a base station, a configuration indicating resources for a first repetition and a second repetition in a physical uplink control channel (PUCCH); and transmitting the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Example 2 is the method of example 1, wherein the resources for the first repetition are associated with a first orthogonal cover code (OCC) vector, the resources for the second repetition are associated with a second OCC vector, the first OCC vector is associated with a first vector index in a first OCC matrix, and the second OCC vector is associated with a second vector index in a second OCC matrix.

Example 3 is the method of example 2, wherein the second vector index is a function of the first vector index and a size of the second OCC matrix.

Example 4 is the method of any of examples 1 to 3, further comprising: skipping transmission of the second repetition.

Example 5 is the method of example 4, wherein the transmission of the second repetition is skipped based on a number of allocated PUCCH resource blocks (RBs), a maximum, configured number of PUCCH resource blocks (RBs), or a PUCCH transmission priority.

Example 6 is the method of any of examples 4 and 5, wherein the configuration indicates a threshold number of symbols for skipping repetitions, and the transmission of the second repetition is skipped in response to a symbol length of the second repetition being less than the threshold number of symbols.

Example 7 is the method of example 6, wherein the configuration is a radio resource control (RRC) configuration, a medium access control (MAC) control element (MAC-CE), or an uplink grant.

Example 8 is the method of any of examples 6 and 7, wherein the threshold number of symbols is a function of a number of allocated PUCCH resource blocks (RBs), a maximum, configured number of PUCCH resource blocks (RBs), or a PUCCH transmission priority.

Example 9 is the method of any of examples 1 to 8, further comprising: receiving an uplink grant activating the UE to skip the transmission of the second repetition.

Example 10 is the method of example 9, wherein the uplink grant indicates a PUCCH identifier, and the transmission of second repetition is skipped in response to the PUCCH identifier being associated with the resources for the second repetition.

Example 11 is the method of any of examples 1 to 3, further comprising transmitting the second repetition in overlapping resources with one of the second UEs.

Example 12 is the method of any of examples 1 to 11, wherein the resources for the first repetition are associated with a first orthogonal cover code (OCC) vector, the resources for the second repetition are associated with a second OCC vector, the first OCC vector is associated with a first vector index in a first OCC matrix, the second OCC vector is associated with a second vector index in a subset of the first OCC matrix.

Example 13 is the method of example 12, wherein the configuration includes a start vector index, the subset of the first OCC matrix includes contiguous or non-contiguous vectors from the first OCC matrix, and the contiguous or non-contiguous vectors are associated with indices starting with the start vector index.

Example 14 is the method of any of examples 1 to 13, wherein the PUCCH includes a format associated with UE multiplexing.

Example 15 is a method of wireless communication at a base station, comprising: transmitting, to a user equipment (UE), a configuration indicating resources for a first repetition and a second repetition in a physical uplink control channel (PUCCH); and receiving the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs.

Example 16 is the method of example 15, wherein the resources for the first repetition are associated with a first orthogonal cover code (OCC) vector, the resources for the second repetition are associated with a second OCC vector, the first OCC vector is associated with a first vector index in a first OCC matrix, and the second OCC vector is associated with a second vector index in a second OCC matrix.

Example 17 is the method of example 16, wherein the second vector index is a function of the first vector index and a size of the second OCC matrix.

Example 18 is the method of any of examples 15 to 17, further comprising: configuring the UE to skip transmission of the second repetition.

Example 19 is the method of example 18, wherein the transmission of the second repetition is skipped based on a number of allocated PUCCH resource blocks (RBs), a maximum, configured number of PUCCH resource blocks (RBs), or a PUCCH transmission priority.

Example 20 is the method of any of examples 18 and 19, wherein the configuration indicates a threshold number of symbols for skipping repetitions, and the transmission of the second repetition is skipped in response to a symbol length of the second repetition being less than the threshold number of symbols.

Example 21 is the method of example 20, wherein the configuration is a radio resource control (RRC) configuration, a medium access control (MAC) control element (MAC-CE), or an uplink grant.

Example 22 is the method of any of examples 20 and 21, wherein the threshold number of symbols is a function of a number of allocated PUCCH resource blocks (RBs), a maximum, configured number of PUCCH resource blocks (RBs), or a PUCCH transmission priority.

Example 23 is the method of any of examples 15 to 22, further comprising: transmitting an uplink grant activating the UE to skip the transmission of the second repetition.

Example 24 is the method of example 23, wherein the uplink grant indicates a PUCCH identifier, and the transmission of second repetition is skipped in response to the PUCCH identifier being associated with the resources for the second repetition.

Example 25 is the method of any of examples 15 to 17, further comprising: receiving the second repetition from the UE in overlapping resources with one of the second UEs.

Example 26 is the method of any of examples 15 to 25, wherein the resources for the first repetition are associated with a first orthogonal cover code (OCC) vector, the resources for the second repetition are associated with a second OCC vector, the first OCC vector is associated with a first vector index in a first OCC matrix, the second OCC vector is associated with a second vector index in a subset of the first OCC matrix.

Example 27 is the method of example 26, wherein the configuration includes a start vector index, the subset of the first OCC matrix includes contiguous or non-contiguous vectors from the first OCC matrix, and the contiguous or non-contiguous vectors are associated with indices starting with the start vector index.

Example 28 is the method of any of examples 15 to 27, wherein the PUCCH includes a format associated with UE multiplexing.

Example 29 is a user equipment (UE) comprising: a memory; and a processor coupled to the memory, the processor and memory being configured to perform the method of any of claims 1-14.

Example 30 is a base station comprising: a memory; and a processor coupled to the memory, the processor and memory being configured to perform the method of any of claims 15-28.

Example 31 is a user equipment (UE) comprising: one or more means for performing the method of any of claims 1-14.

Example 32 is a base station comprising: one or more means for performing the method of any of claims 15-28.

Example 33 is a non-transitory computer-readable storage medium having instructions stored thereon for performing the method of any of claims 1-14 for wireless communication by a user equipment (UE).

Example 34 is a non-transitory computer-readable storage medium having instructions stored thereon for performing the method of any of claims 15-28 for wireless communication by a base station.

What is claimed is:

1. A method of wireless communication at a user equipment (UE), comprising:
   receiving, from a base station, a configuration indicating resources for a first repetition and a second repetition in a physical uplink control channel (PUCCH);
   skipping transmission of the second repetition; and
   transmitting the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs, wherein the configuration indicates a threshold number of symbols for skipping repetitions, and the transmission of the second repetition is skipped in response to a symbol length of the second repetition being less than the threshold number of symbols.

2. The method of claim 1, wherein the resources for the first repetition are associated with a first orthogonal cover code (OCC) vector, the resources for the second repetition are associated with a second OCC vector, the first OCC vector is associated with a first vector index in a first OCC matrix, and the second OCC vector is associated with a second vector index in a second OCC matrix.

3. The method of claim 2, wherein the second vector index is a function of the first vector index and a size of the second OCC matrix.

4. The method of claim 1, wherein the transmission of the second repetition is skipped based on a number of allocated PUCCH resource blocks (RBs), a maximum number of resource blocks (RBs) configured by a base station, configured number of PUCCH resource blocks (RBs), or a PUCCH transmission priority.

5. The method of claim 1, wherein the configuration is a radio resource control (RRC) configuration, a medium access control (MAC) control element (MAC-CE), or an uplink grant.

6. The method of claim 1, wherein the threshold number of symbols is a function of a number of allocated PUCCH resource blocks (RBs), a maximum number of resource blocks (RBs) configured by a base station, configured number of PUCCH resource blocks (RBs), or a PUCCH transmission priority.

7. The method of claim 1, further comprising:
   receiving an uplink grant activating the UE to skip the transmission of the second repetition.

8. The method of claim 7, wherein the uplink grant indicates a PUCCH identifier, and the transmission of the second repetition is skipped in response to the PUCCH identifier being associated with the resources for the second repetition.

9. The method of claim 1, further comprising:
   transmitting the second repetition in overlapping resources with one of the second UEs.

10. The method of claim 1, wherein the resources for the first repetition are associated with a first orthogonal cover code (OCC) vector, the resources for the second repetition are associated with a second OCC vector, the first OCC vector is associated with a first vector index in a first OCC matrix, the second OCC vector is associated with a second vector index in a subset of the first OCC matrix.

11. The method of claim 10, wherein the configuration includes a start vector index, the subset of the first OCC matrix includes contiguous or non-contiguous vectors from the first OCC matrix, and the contiguous or non-contiguous vectors are associated with indices starting with the start vector index.

12. The method of claim 1, wherein the PUCCH includes a format associated with UE multiplexing.

13. A method of wireless communication at a base station, comprising:
   transmitting, to a user equipment (UE), a configuration indicating resources for a first repetition and a second repetition in a physical uplink control channel (PUCCH);
   receiving the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs; and
   configuring the UE to skip transmission of the second repetition, wherein the configuration indicates a threshold number of symbols for skipping repetitions, and the transmission of the second repetition is skipped in response to a symbol length of the second repetition being less than the threshold number of symbols.

14. The method of claim 13, wherein the resources for the first repetition are associated with a first orthogonal cover code (OCC) vector, the resources for the second repetition are associated with a second OCC vector, the first OCC vector is associated with a first vector index in a first OCC matrix, and the second OCC vector is associated with a second vector index in a second OCC matrix.

15. The method of claim 14, wherein the second vector index is a function of the first vector index and a size of the second OCC matrix.

16. The method of claim 13, wherein the transmission of the second repetition is skipped based on a number of allocated PUCCH resource blocks (RBs), a maximum number of RBs configured by a base station, configured number of PUCCH resource blocks (RBs), or a PUCCH transmission priority.

17. The method of claim 13, wherein the configuration is a radio resource control (RRC) configuration, a medium access control (MAC) control element (MAC-CE), or an uplink grant.

18. The method of claim 13, wherein the threshold number of symbols is a function of a number of allocated PUCCH resource blocks (RBs), a maximum number of RBs configured by a base station, configured number of PUCCH resource blocks (RBs), or a PUCCH transmission priority.

19. The method of claim 13, further comprising:
    transmitting an uplink grant activating the UE to skip the transmission of the second repetition.

20. The method of claim 19, wherein the uplink grant indicates a PUCCH identifier, and the transmission of the second repetition is skipped in response to the PUCCH identifier being associated with the resources for the second repetition.

21. The method of claim 13, further comprising:
    receiving the second repetition from the UE in overlapping resources with one of the second UEs.

22. The method of claim 13, wherein the resources for the first repetition are associated with a first orthogonal cover code (OCC) vector, the resources for the second repetition are associated with a second OCC vector, the first OCC vector is associated with a first vector index in a first OCC matrix, the second OCC vector is associated with a second vector index in a subset of the first OCC matrix.

23. The method of claim 22, wherein the configuration includes a start vector index, the subset of the first OCC matrix includes contiguous or non-contiguous vectors from the first OCC matrix, and the contiguous or non-contiguous vectors are associated with indices starting with the start vector index.

24. The method of claim 13, wherein the PUCCH includes a format associated with UE multiplexing.

25. A user equipment (UE) configured for wireless communications, comprising:
    a processor;
    memory coupled with the processor; and
    instructions stored in the memory and operable, that when executed by the processor, to cause the UE to:
        receive, from a base station, a configuration indicating resources for a first repetition and a second repetition in a physical uplink control channel (PUCCH);
        skip transmission of the second repetition; and
        transmit the first repetition, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs, wherein the configuration indicates a threshold number of symbols for skipping repetitions, and the transmission of the second repetition is skipped in response to a symbol length of the second repetition being less than the threshold number of symbols.

26. A base station configured for wireless communication, comprising:
    a processor;
    memory coupled with the processor; and
    instructions stored in the memory that when executed by the processor cause the base station to:
        transmit, to a user equipment (UE), a configuration indicating resources for a first repetition and a second repetition in a physical uplink control channel (PUCCH); and
        receive the first repetition from the UE, wherein the first repetition includes a larger symbol length than the second repetition, the resources for the first repetition multiplex a plurality of transmissions from first UEs including the UE, the resources for the second repetition multiplex a plurality of transmissions from second UEs, and a quantity of the first UEs is larger than a quantity of the second UEs; and
        configure the UE to skip transmission of the second repetition, wherein the configuration indicates a threshold number of symbols for skipping repetitions, and the transmission of the second repetition is skipped in response to a symbol length of the second repetition being less than the threshold number of symbols.

* * * * *